United States Patent Office 3,485,857
Patented Dec. 23, 1969

3,485,857
ORGANOMETALLIC AMINOSILICON COMPOUNDS
John L. Speier, Midland, Mich., assignor to Dow Corning Corporation, Midland, Mich., a corporation of Michigan
No Drawing. Original application Dec. 5, 1966, Ser. No. 598,892, now Patent No. 3,445,425, dated May 20, 1969. Divided and this application Oct. 16, 1968, Ser. No. 796,251
Int. Cl. C07f 7/10, 7/24, 15/00
U.S. Cl. 260—429                27 Claims

ABSTRACT OF THE DISCLOSURE

A class of compounds having both a silicon-nitrogen bond and a metal-carbon bond, useful as intermediates in the preparation of organosilicon compounds having silicon functionality, carbon functionality or both. Specific examples of this class of compounds include $$(CH_3)_2NSi(CH_3)_2\overset{Li}{\underset{|}{C}}H(CH_2)_4CH_3$$

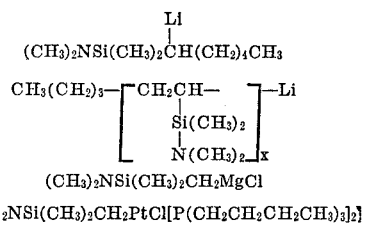

and
$(CH_3)_2NSi(CH_3)_2CH_2MgCl$
$(CH_3)_2NSi(CH_3)_2CH_2PtCl[P(CH_2CH_2CH_2CH_3)_3]_2]$ The process for preparing the lithium derivatives of these compounds wherein an organolithium compound and a diorgano aminosilane having ethylenic unsaturation are contacted under anhydrous conditions.

---

This is a division of application Ser. No. 598,892, filed Dec. 5, 1966, now Patent No. 3,445,425, issued May 20, 1969.

This invention relates to organometallic aminosilicon compounds having a silicon-nitrogen bond and a carbon-metal bond, to a process for the preparation of organometallic aminosilicon compounds and to derivatives of the organometallic aminosilicon compounds.

It is known in the art that organometallic reagents are reactive with electronegative groups. The Grignard reagents are excellent examples of this reactivity, see "Grignard Reactions of Non-Metallic Substances" by M. S. Kharasch and O. Reinmuth, Prentice-Hall, Inc., New York (1954) and "Organo-metallic Compounds" by G. E. Coates, Second Edition, 1960, John Wiley and Sons, Inc., New York.

The use of organometallic reagents in the preparation of silicon compounds have been known for a long time. In 1863, Friedel and Crafts prepared tetraethylsilane by the reaction of tetrachlorosilane and diethylzinc. In 1904, the Grignard reagents were used to form siliconcarbon bonds by reacting chlorosilanes with R*M$_g$X where R* is a hydrocarbon radical and X is a halogen atom. These and other reactions of organometallic reagents with silicon compounds are discussed by C. Eaborn in "Organosilicon Compounds," 1960, Butterworths Scientific Publications, London.

Eaborn shows that Grignard reagents react with silicon-halides, silicon-alkoxides, silicon-hydrides, siloxanes and silicon-pseudohalides containing compounds to give the normal Grignard products, pages 11 to 19. Eaborn also shows that organolithium reagents react even more readily with silicon-halides, silicon-alkoxides and silicon-hydrides to give products wherein the organo group of the organo-lithium reagent replaces the electronegative group on the silicon atom, pages 19 to 21. Eaborn also shows that organosodium, organopotassium, organozinc, organoaluminum, and organomercury react with the silicon-halides, silicon alkoxides and the like, as do the Grignard reagents and the organolithium reagents.

Thus, the art clearly recognizes that organo-metallic reagents of the type R*-metal react very well with electronegative groups attached to a silicon atom. The reaction ≡Si—Y+R*-metal→ ≡SiR*+metal-Y where Y is an electronegative group, has been used very extensively for the synthesis of useful organosilicon compounds, especially when the metal is Li, Na, K, Mg, Al, Zn and Hg. The first five metals are the most widely used and are also used commercially.

Since organometallic reagents react so well with electronegative groups on silicon, an organometallic reagent having a —Si—Y group is unknown. Eaborn sums this up very nicely on page 392.

"There can be no hope, for example, of preparing a Grignard reagent from a chloroalkylsilicon compound containing a normally reactive Si—Cl bond (e.g. ClMe$_2$SiCH$_2$Cl) since if any of the reagent were formed it would immediately be destroyed by interaction with this bond. Nor can such a compound be exposed to nucleophilic reagents without preferential reaction at the Si—Cl bond."

It is also known that organolithium reagents react with vinyltriorganosilanes to form lithium reagents and polymers, L. F. Cason and H. G. Brooks, Journal of the American Chemical Society, vol. 74, 1952, pages 4582–4583; L. F. Cason and H. G. Brooks, Journal of the Chemical Society, vol. 19, 1954, pages 1278–1282 and M. S. Nametkine, A. V. Topchiev and S. G. Dourgarian, Journal of Polymer Science, Part C, No. 4, 1963, pages 1053–1059.

The applicant has unexpectantly found a new class of organometallic compounds which contain an electronegative group on a silicon atom. Therefore, an object of this invention is to provide a novel organometallic compound containing an electronegative group on a silicon atom, more specifically an organometallic aminosilicon compound. Another object is to provide a method for preparing the novel organometallic aminosilicon compounds. Still another object is to provide novel derivatives from the organo-metallic aminosilicon compounds. These and other objects will become apparent from the following detailed description of the invention.

This invention relates to an organometallic aminosilicon compound having at least one silicon group of the general formula

wherein any remaining valence of the silicon atom is bonded to a carbon atom which is an atom in a radical selected from the group consisting of an organic radical composed of atoms selected from the group consisting of carbon, hydrogen, nitrogen and oxygen in the form of ether linkages and an organosilicon radical composed of atoms selected from the group consisting of silicon, carbon, hydrogen, nitrogen, and oxygen in the form of ether linkages, in which there is present a M-carbon bond, where R is a monovalent radical bonded to the silicon atom through a silicon-carbon bond and composed of carbon, hydrogen, nitrogen, silicon or oxygen atoms in the form of ether linkages, R' is a monovalent radical bonded to the nitrogen atom through a silicon-nitrogen bond or a carbon-nitrogen bond and composed of carbon, hydrogen, nitrogen, silicon or oxygen atoms in the form of ether linkages, M is a metal selected from the group consisting of Li, Na, K, Al, Mg, Hg, Pt, Cd, Pb, Zn, MgR, MgX, HgR, HgX, PbX, PbX$_3$, PbR, PbX$_2$R, PbXR$_2$, AlXR, AlX$_2$ AlR$_2$, CdX, CdR, PtX(PR$_3$)$_2$, PtXR$_2$, ZnR and ZnX, X is a halogen atom, $m$, is an integer from 1 to 3 inclusive, $a$ is an integer from 0 to 2 inclusive, the sum of $a+m$ does not exceed 3, any silicon atom in the organometallic aminosilicon compound is bonded only to an atom selected from the group consisting of carbon and nitrogen, any nitrogen atom in the orangometallic aminosilicon compound is bonded only to an atom selected from the group consisting of silicon and carbon, any R and R′ can be bonded together to form a cyclic structure, and the organic groups are free of —C≡CH groups.

The organometallic aminosilicon compounds of the present invention are unique in that they contain both a silicon-nitrogen linkage and a carbon metal linkage in the same compound. The organometallic aminosilicon compounds of the present invention can be monomers, dimers, trimers, tetramers, polymers and copolymers of two or more monomeric units.

The organometallic aminosilicon compounds of this invention is limited to a new class of compounds in which each compound has at least one —SiR$_a$(NR′$_2$)$_m$ group and at least one radical bonded to a —SiR$_a$(NR′$_2$)$_m$ group through a silicon-carbon bond, in which there is a carbon-metal bond.

In the —SiR$_a$(NR′$_2$)$_m$, R is a monovalent radical bonded to the silicon atom through a silicon-carbon bond and composed of carbon, hydrogen, nitrogen, silicon or oxygen atoms wherein the nitrogen atoms are bonded either to carbon or silicon or both carbon and silicon and the oxygen atoms are present only as ether linkages. Some specific examples of R are alkyl radicals, such as methyl, ethyl, propyl, isopropyl, butyl, isobutyl, pentyl, isopentyl, neopentyl, hexyl, octyl, dodecyl, octadecyl, 3-methyl heptyl, 6-butyloctadecyl, tertiary butyl and 2,2-diethylpentyl; alkenyl radicals, such as allyl, hexenyl, butenyl, 3-octenyl, 4,9-octadecadienyl and 4-nonenyl; alkynyl radicals, such as propynyl, heptynyl, butynyl, decynyl and alkenynyl radicals, such as 1-penten-3-ynyl, 2-ethyl-1-buten-3-ynyl and cycloaliphatic radicals, such as cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1$^{3,8}$] - 5 - nonenyl, spiro[4.5] decyl, dispiro-[4.1.4.2]-1-tridecenyl, decahydronaphthyl, 2,3 - dihydroindyl and 1,2,3,4-tetrahydronaphthyl; aryl radicals, such as, phenyl, tolyl, xylyl, 3-ethylphenyl, naphthyl, pentaphenyl, 3,4-methylethylphenyl, 2-phenyl-octyl, 3-methyl-2-(4-isopropylphenyl)heptyl, benzyl, xenyl, 2-ethyl-tolyl, 2-ethyl-p-cymenyl, diphenyl-methyl, 4,5 - diphenylpentyl, 4-m-terphenyl, 9,9′-bifluoryl and β - phenylethyl; tertiary organic nitrogen radicals, such as —CH$_2$N(CH$_3$)$_2$,
—CH$_2$CH$_2$CH$_2$NCH$_2$CH$_3$
　　　　　　　|
　　　　　　 CH$_3$
—CH$_2$CH$_2$CH$_2$CH$_2$N(CH$_3$)$_2$

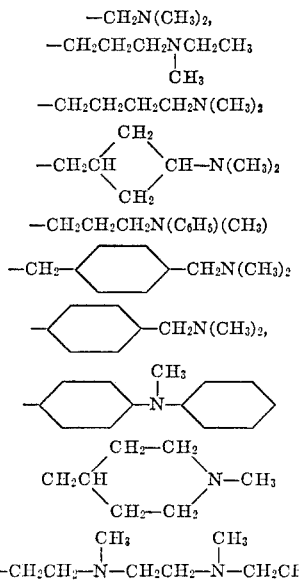

—CH$_2$CH$_2$CH$_2$N(C$_6$H$_5$)(CH$_3$)

and

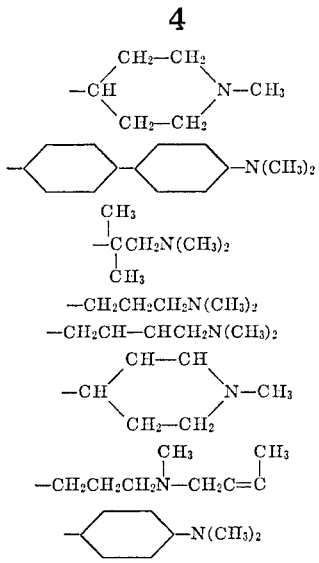

ether radicals, such as:

—CH$_2$OCH$_3$
—CH$_2$CH$_2$OCH$_3$
—CH$_2$CH$_2$CH$_2$OCH$_3$
—CH$_2$CH$_2$CH$_2$OCH$_2$CH$_3$
—CH$_2$OCH$_2$CH$_2$CH$_3$
—CH$_2$CH$_2$CH$_2$OCH(CH$_3$)$_2$

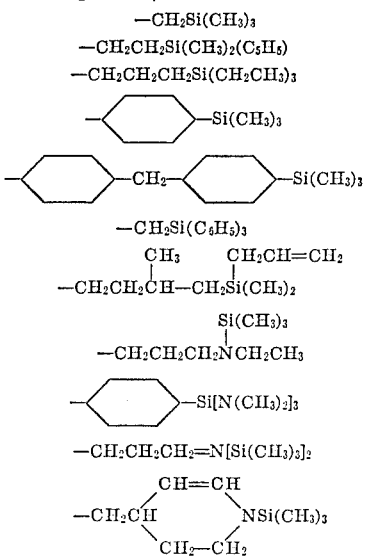

and

—CH$_2$CH$_2$OCH$_2$CH$_3$ and silicon containing radicals, such as:

—CH$_2$Si(CH$_3$)$_3$
—CH$_2$CH$_2$Si(CH$_3$)$_2$(C$_6$H$_5$)
—CH$_2$CH$_2$CH$_2$Si(CH$_2$CH$_3$)$_3$

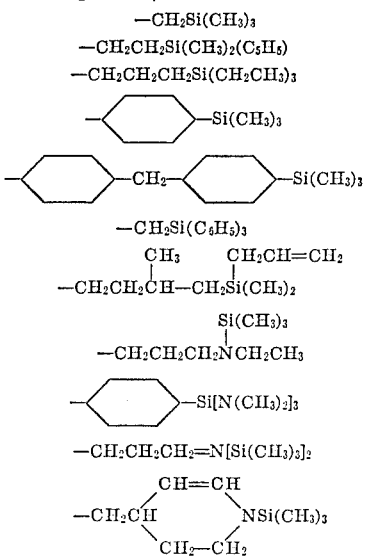

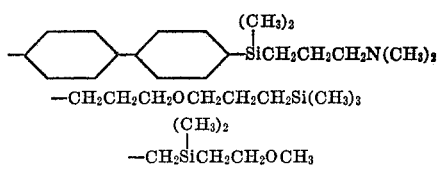

In the —SiR$_a$(NR'$_2$)$_m$ group, R' is a monovalent radical bonded to the nitrogen atom through a silicon-nitrogen bond or a carbon-nitrogen bond and composed of carbon, hydrogen, nitrogen, silicon or oxygen atoms wherein the nitrogen atoms are bonded either to carbon or silicon or both silicon and carbon and the oxygen atoms are present only as ether linkages. The specific examples of R' are defined above for R and in addition R can also be silyl radicals, examples of which include: —Si(CH$_3$)$_3$ —Si(CH$_2$CH$_3$)$_3$

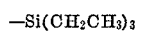

—Si(C$_6$H$_5$)$_3$

—Si(CH$_3$)$_2$(C$_6$H$_5$)

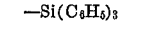

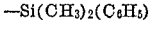

or any silyl group —SiR$_3$ wherein each R is defined above. R and R' are preferably alkyl radicals, aryl radicals, alkaryl radicals or aralkyl radicals.

The —SiR$_a$(NR'$_2$)$_m$ group can have up to 2 R radicals per silicon atom and 1 to 3 —NR'$_2$ radicals per silicon atom, therefore $a$ can be 0, 1 or 2 and $m$ can be 1, 2 or 3.

Examples of the —SiR$_a$(NR'$_2$)$_m$ group are as follows:

—Si[N(CH$_3$)$_2$]$_3$
—Si(CH$_3$)[N(CH$_3$)$_2$]$_2$
—Si(CH$_3$)$_2$[N(CH$_3$)$_2$]
—Si[N(CH$_3$)(C$_2$H$_5$)]$_3$
—Si[N(C$_2$H$_5$)$_2$]$_3$
—Si[N(C$_3$H$_7$)$_2$]$_3$
—Si[N(CH$_3$)(CH$_2$CH$_2$CH$_2$CH$_2$CH$_3$)]$_3$
—Si[N(CH$_3$)(C$_{12}$H$_{25}$)]$_3$
—Si[N(C$_{16}$H$_{37}$)$_2$]$_3$
—Si[N[C(CH$_3$)$_3$]$_2$]$_3$
—Si[N(CH$_3$)(CH$_2$CH=CH$_2$)]$_3$
—Si[N(C$_2$H$_5$)(CH$_2$CH$_2$CH=CHCH$_2$CH$_3$)]$_3$
—Si[N(CH$_3$)(CH$_2$C≡CCH$_3$)]$_3$
—Si[N(CH$_3$)(CH=CH—CH=CH—C=C)]$_3$

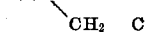

—Si[N(CH$_3$)(C$_6$H$_5$)]$_3$
—Si[N(C$_6$H$_5$)$_2$]$_3$

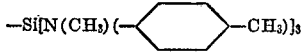
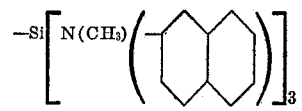
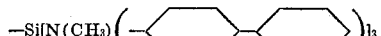
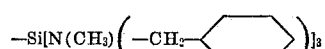
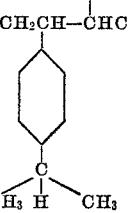
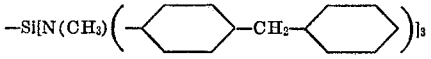
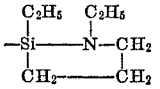

—Si[N—CH$_2$CH$_2$CH$_2$CH$_2$N(CH$_3$)$_2$]$_3$ (with CH$_3$ on N)

—Si[NCH$_2$CH$_2$CH$_2$NCH$_3$]$_3$ (with C$_3$H$_7$ and C$_6$H$_5$)

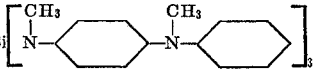

—Si[N(CH$_3$)(CH$_2$CH$_2$OCH$_3$)]$_3$
—Si[N(CH$_2$CH$_2$CH$_2$OCH$_2$CH$_3$)$_2$]$_3$

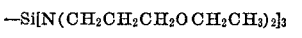

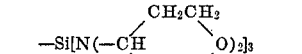

—Si[NCH$_2$Si(CH$_3$)$_3$]$_3$ (with CH$_3$)

—Si(N[CH$_2$CH$_2$CH$_2$Si(CH$_2$CH$_3$)$_2$]$_2$)$_3$ (with CH$_3$)

—Si[N—CH$_2$CH$_2$CHCH$_2$Si(CH$_3$)$_2$]$_3$ (with CH$_3$, CH$_3$, CH$_2$CH=CH$_2$)

—Si[NCH$_2$CH$_2$CH$_2$NCH$_2$CH$_3$]$_3$ (with CH$_3$, CH$_3$)

—Si[NCH$_2$CH$_2$CH$_2$OCH$_2$CH$_2$CH$_2$Si(CH$_3$)$_3$]$_3$ (with CH$_3$)

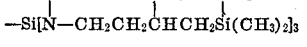

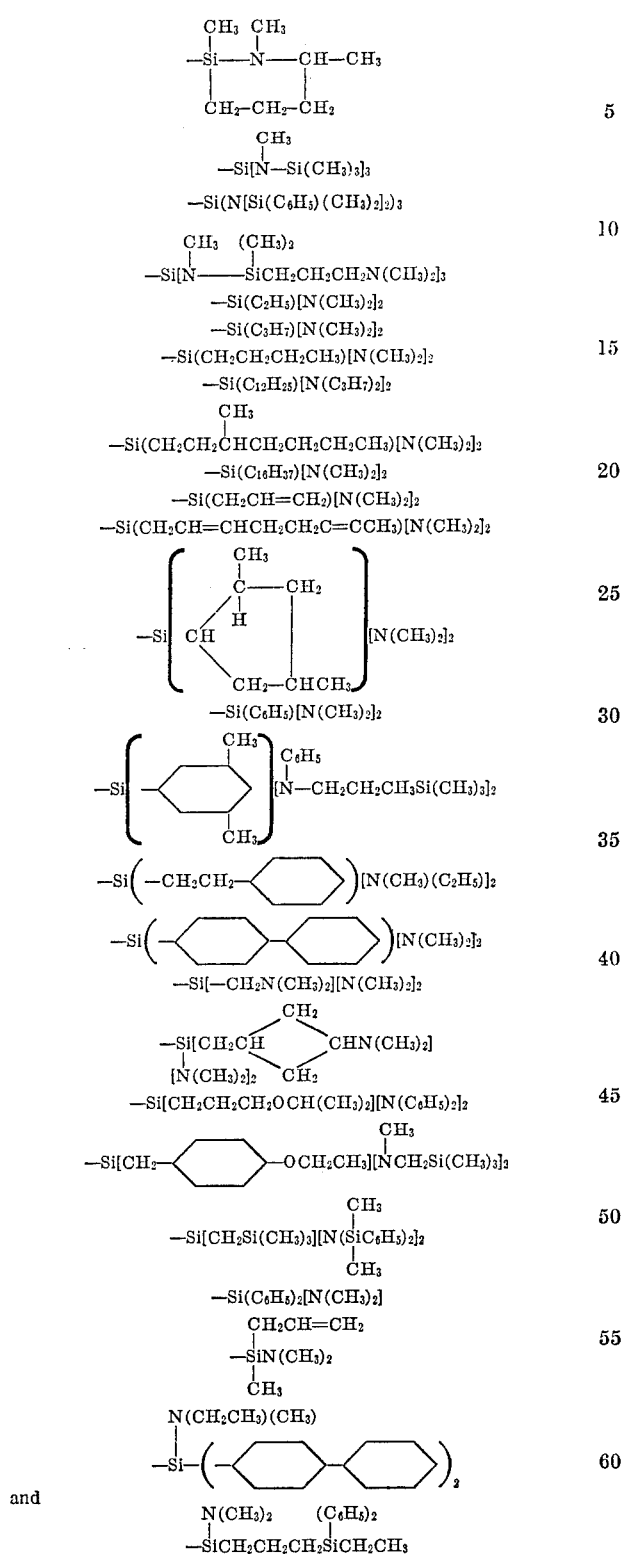

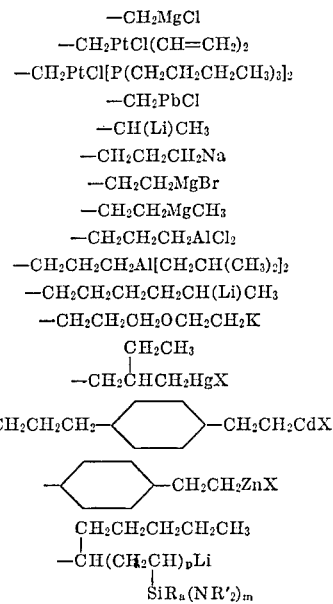

HgR, HgX, PbX, PbR, PbX₃, PbX₂R, PbXR₂, PtXR₂, PtX(PR₃)₂, AlX₂, AlXR, AlR₂, CdR, CdX or ZnX, ZnR where X is a halogen atom such as chlorine, bromine, iodine or fluorine.

Examples of these radicals, of the type —R'''—M, are as follows:

$$-CH_2MgCl$$
$$-CH_2PtCl(CH=CH_2)_2$$
$$-CH_2PtCl[P(CH_2CH_2CH_2CH_3)_3]_2$$
$$-CH_2PbCl$$
$$-CH(Li)CH_3$$
$$-CH_2CH_2CH_2Na$$
$$-CH_2CH_2MgBr$$
$$-CH_2CH_2MgCH_3$$
$$-CH_2CH_2CH_2AlCl_2$$
$$-CH_2CH_2CH_2Al[CH_2CH(CH_3)_2]_2$$
$$-CH_2CH_2CH_2CH_2CH(Li)CH_3$$
$$-CH_2CH_2CH_2OCH_2CH_2K$$

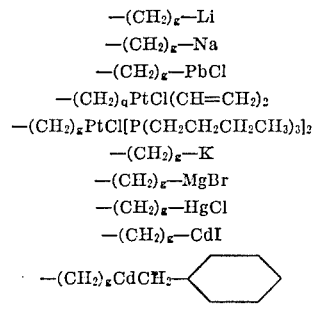

where $p$ is a positive integer including zero $$-(CH_2)_g-Li$$
$$-(CH_2)_g-Na$$
$$-(CH_2)_g-PbCl$$
$$-(CH_2)_gPtCl(CH=CH_2)_2$$
$$-(CH_2)_gPtCl[P(CH_2CH_2CH_2CH_3)_3]_2$$
$$-(CH_2)_g-K$$
$$-(CH_2)_g-MgBr$$
$$-(CH_2)_g-HgCl$$
$$-(CH_2)_g-CdI$$

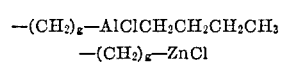

$$-(CH_2)_g-AlCl_2$$

$$-(CH_2)_g-AlClCH_2CH_2CH_2CH_3$$
$$-(CH_2)_g-ZnCl$$

where $g$ is a positive integer of at least 1,

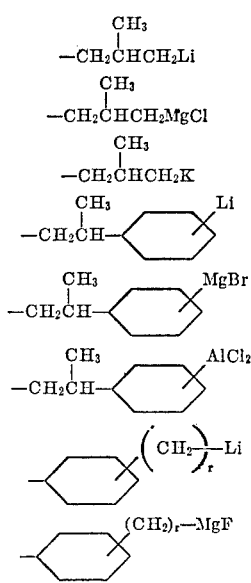

The —SiR$_a$(NR'$_2$)$_m$ group is attached to one, two or three radicals bonded through silicon-carbon linkages. The sum of $a+m$ does not exceed 3 and thus the remaining valences of the silicon atom are bonded to these radicals. These radicals are organic radicals composed of carbon, hydrogen, nitrogen and/or oxygen in the form of ether linkages or an organosilicon radical composed of silicon, carbon, hydrogen, nitrogen and/or oxygen atoms in the form of ether linkages. These radicals have a M— carbon bond where M is a metal or metal group of Li, Na, K, Al, Pt, Pb, Mg, Hg, Cd, Zn, MgR, MgX,

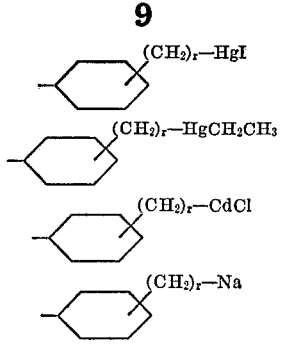

wherein r is a positive integer of at least 1,

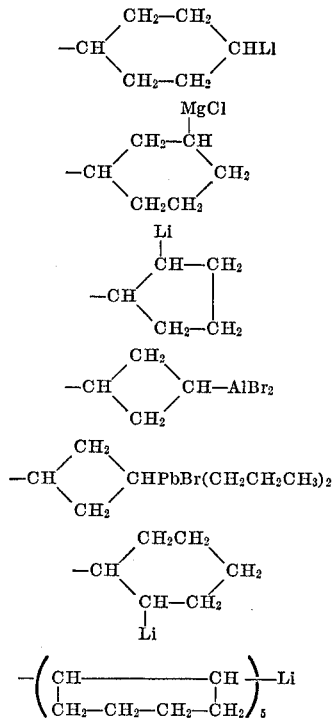

where a is a positive integer of at least 1

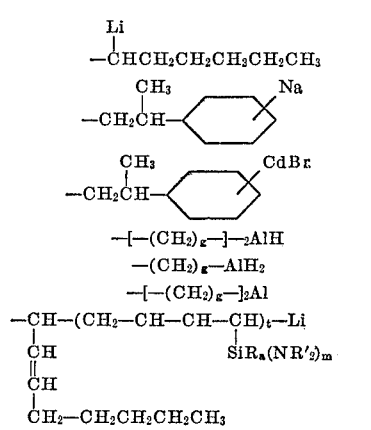

t is a positive integer including 0

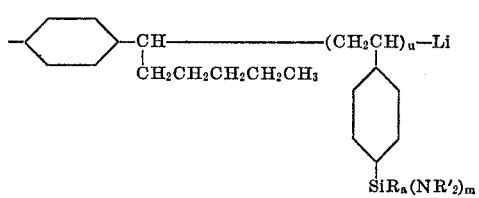

where u is a positive integer including 0

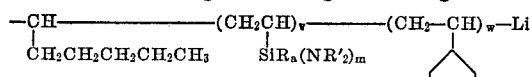

where v and w are each positive integers of at least 1

$$-CH\underset{\underset{CH_2CH_2CH_2CH_2CH_3}{|}}{\phantom{X}}-(CH_2CH)_v-\underset{\underset{SiR_a(NR'_2)_m}{|}}{\phantom{X}}-(CH_2-\underset{\underset{\bigcirc}{|}}{\overset{\overset{CH_3}{|}}{C}}-)_w-Li$$

and $$-CH\underset{\underset{CH_2CH_2CH_2CH_2CH_3}{|}}{\phantom{X}}-(CH_2CH)_v-\underset{\underset{SiR_a(NR'_2)_m}{|}}{\phantom{X}}-(CH_2C-\overset{\overset{CH_3}{|}}{CHCH_2})_w-Li$$

The organometallic aminosilicon compounds of the present invention are free of —C≡CH groups, because these groups destroy the metal-carbon bond.

The organometallic aminosilicon compounds of the present invention can be made by several different methods. The best modes of preparation are included in the following discussion.

The organolithium aminosilicon compounds can be prepared by a process which comprises (I) contacting under essentially anhydrous conditions a (diorganoamino) silicon compound of the formula

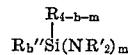

wherein R and R' are defined above, R'' is a monovalent hydrocarbon radical selected from the group consisting of vinyl radicals, conjugated unsaturated aliphatic radicals and conjugated unsaturated aromatic-aliphatic radicals, b is an integer from 1 to 3, m is defined above and the sum of b+m has a maximum of 4, and an organolithium compounds of the formula Li—R where R is defined above and thereafter (II) recovering the organolithium (diorganoamino) silicon compound.

This process for preparing the organolithium-(diorganoamino) silicon compounds can be carried out at room temperature, below room temperature or by heating the contacted mixture. The (diorganoamino) silicon compound is contacted by the organolithium compound in the presence of an inert organic solvent. The inert organic solvent is inert to reactions with the other ingredients present. Examples of some of the inert organic solvents include, diethyl ether, tetrahydrofuran, toluene, benzene, xylene, dioxane, hexane, methyl isopropylether, octane, dibutylether, hexylmethylether and isobutylmethyl ether.

R'' is a monovalent hydrocarbon radical selected from the group consisting of vinyl radicals, conjugated unsaturated aliphatic radicals and conjugated unsaturated aliphatic-aromatic radicals such as:

1,3-butadienyl
1,3-hexadienyl
3-methylbuta-1,3-dienyl

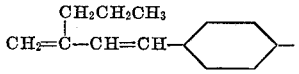

1,3-cyclopentadienyl
4-ethyl-1,3-cyclopentadienyl

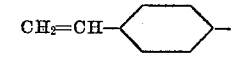

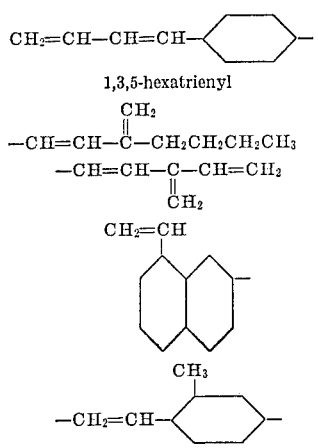

and

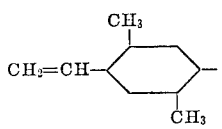

The silane

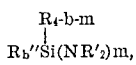

can be mixed with Li—R to produce an organolithium amino silicon compound of the formula

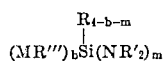

wherein the variables are defined above. R''' is a divalent organic radical bonded to M through a M-carbon bond and to Si through a Si-carbon bond and composed of carbon, hydrogen, nitrogen, silicon or oxygen in the form of ether linkages. Preferably the silane and Li—R are mixed in the presence of an inert organic solvent. The system is also preferably anhydrous in that moisture destroys Li—R and additional quantities are therefore needed if moisture is present.

The organolithium aminosilicon compound can be recovered by well-known methods, such as by crystallization, precipitation, distillation and solvent evaporation. However, the by-products are usually salts and can readily be removed by filtration and the organolithium aminosilicon compound can be used in the solvent solution in which it is prepared.

The silanes

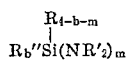

can be readily prepared by contacting a halosilane of the formula

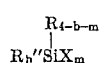

with the desired amine, $HNR'_2$, both can be purchased commercially or can be prepared by well-known methods, preferably in excess to obtain high yields and ensure complete replacement of the halogen atoms.

A useful variation of the above process is a method of making copolymers wherein along with the silane

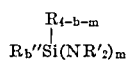

unsaturated conjugated organic compounds are added. These unsaturated conjugated organic compounds can be for example, styrene, alpha-methylstyrene, isoprene, vinyl-naphthylene, butadiene, vinyltoluene, 1,3-hexadiene, divinylbenzene, vinylxylene, cyclobutadiene, 1,3-cyclopentadiene, and $CH_3CH_2OCH_2CH=CHCH=CH_2$.

It is also within the scope of the present invention to contact two or more different silanes

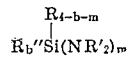

with Li—R.

The above reaction is preferably carried out under an inert atmosphere, such a helium or nitrogen.

Another method for the preparation of the organometallic aminosilicon compounds is the reaction of

with magnesium under anhydrous conditions, usually in an inert organic solvent such as an ether. The conventional Grignard conditions can be used. The products are organomagnesium aminosilicon compounds of the formula

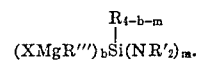

Organometallic aminosilicon compounds, other than where the metal is lithium or magnesium can be prepared by reacting the appropriate metal halide, organometal halide or metal with the organolithium or organomagnesium aminosilicon compound. For example $AlCl_3$ can be added to

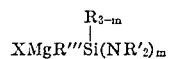

to give

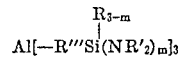

or $HgBr_2$ can be added to

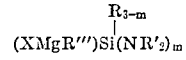

to give

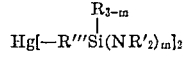

Instead of $AlCl_3$ and $AlX_3$, $RAlX_2$ or $R_2AlX$ can be used. Similarly $HgX_2$ or $RHgX$ can be used, as well as $CdX_2$, $RCdX$, $ZnX_2$, $PbX_2$, $R_2PtX_2$ or $RZnX$. In a similar manner any

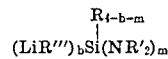

can be reacted with Na, K, $Al_3$, $R_2AlX$, $HgX_2$, and any of the other metal halogen compounds described above to give the corresponding organometallic aminosilicon compound. X and R are defined above. Any of the conventional methods and techniques for preparing organoaluminum, organomercury, organocadmium, organozinc, organosodium or organopotassium can be used to prepare the corresponding organometallic aminosilicon compounds.

One preferred embodiment of the present invention is when a silazane of the formula

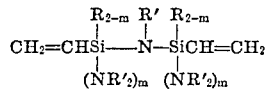

where R and R' are defined and $m$ is 0, 1 or 2 is contacted with Li–R to produce a compound of the formula

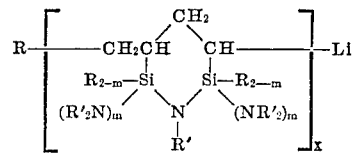

wherein R, R' and m are defined above and x is at least 1. The lithium atom of the above compound can be replaced by hydrogen to obtain a new polymer by washing the product with an alcohol. These compounds and polymers are particularly useful in preparing copolymers of organic monomers or polymers. The copolymers thus prepared can be cured and reacted as if they were silicon polymers.

Another preferred embodiment of the present invention is a hydrolysis derivative of an organometallic aminosilicon compound of the formula

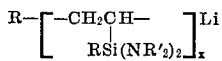

Hydrolysis of the above compound with diulute hydrochloric acid or acetic acid, produces a new compound of the formula

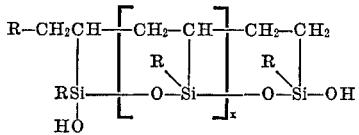

These silicon polymers can be used as thermoplastic coatings and for fibers.

The organometallic aminosilicon compounds of the present invention are useful to prepare silanes and siloxanes having new carbon functional groups as well as functional silicon groups. The M—C bond can undergo any of the normal reactions without disturbing the $SiNR'_2$ group, therefore the carbon portion of an organosilicon compound can be altered by reactions which under other conditions, such as when SiCl is present, could not be done. After the organo portion is altered, the $SiNR'_2$ can then be converted to the other silicon functional groups such as SiCl, SiOH, SiOR and the like. The result is that an entire new area of organosilicon compounds has been developed, which provides the silicone art with one of the most useful tools in preparing difficult to prepare compound, by an easy to use method.

The following examples are illustrative only of this invention and should not be construed as limiting the scope thereof, which is properly delineated in the appended claims.

For a better understanding of the present invention and the examples, the following information is given.

INSTRUMENTAL ANALYSIS

Commercial instruments were used for vapor phase chromatographic analyses, nuclear magnetic resonance analyses, infrared analyses, gas liquid chromatographic analyses, boiling points and melting points.

SOLVENTS

Commerical hexane and pentane were washed with concentrated sulfuric acid and stored over molecular sieves. Tetrahydrofuran was used as purchased and the thiophene-free benzene was azeotropically dried before use.

REACTANTS

Isoprene, styrene and alpha-methylstyrene were dried over molecular sieves. Diethylamine, dimethylamine, methylamine, solutions of n-butyllithium and tertiary-butyllithium in hydrocarbons were used as purchased. Trimethylchlorosilane, B.P. 57° C., dimethyldichlorosilane, B.P. 70° C., methylthrichlorosilane, B.P. 64° C., vinyltrichlorosilane, B.P. 90° C., vinylmethyldichlorosilane, B.P. 92° C., and vinyldimethylchlorosilane, B.P. 82° C. are commercial products. n-Butyltrimethylsilane was prepared as a vapor phase chromatographic standard by the reaction of n-butyllithium and trimethylchlorosilane.

(A) Preparation of vinyldimethyl(dimethylamino)silane

Dimethylamine was bubbled through a solution of 58.8 g. (4.88 moles) vinyldimethylchlorosilane in 2.5 liters of pentane until no further reaction occurred at 10° to 20° C. The dimethylammoniumchloride was filtered from the liquid and washed with pentane. The combined washings and filtrate were distilled to give 355 g. (2.75 moles) of vinyldimethyl(dimethylamino)silane, a 56.4% yield, having a boiling point of 107° C. at 748 mm. of Hg, refractive index of $N_D^{25}$ 1.4170 and specific gravity of $d_4^{25}$ of 0.7725.

Gas-liquid chromatographic analysis showed the product to be pure. Nuclear magnetic resonance spectra showed the $SiCH_3$ at 9.92 tau, $NCH_3$ at 7.58 tau and $SiCH=CA_2$ at 4.7 tau and 3.8 tau in the ratio of 6.1/6.0/3.0.

Calculated for $(CH_2=CH)(CH_3)_2SiN(CH_3)_2$, the neutralization equivalent is 129.3 and the percent silicon is 21.7%; found a neutralization equivalent of 132 and 21.2% silicon.

(B) Preparation of vinylmethylbis(dimethylamino)silane

The method of preparation was the same as in (A) above. 461 g. (3.26 moles) of vinylmethyldichlorosilane in 3 liters of pentane gave 399 g. (2.52 moles) of vinylmethylbis(dimethylamino)silane, a 77.4% yield, having a boiling point of 83° C. at 100 mm. of Hg, a refractive index of $N_D^{25}$ 1.4337 and a specific gravity of $d^{25}$ 0.8243.

Nuclear magnetic resonance showed tau values of 9.95 for $CH_3Si$, 7.54 for $CH_3N$ and 4.7 and 3.6 for $CH_2$–CHSi in the ratio of 3/11.95/2.93 (calculated ratio 3/12/3).

Elemental analysis showed 53.0% carbon, 11.45% hydrogen, 17.46% nitrogen and 17.60% silicon; calculated for $(CH_2=CH)(CH_3)Si[N(CH_3)_2]_2$, 53.1% carbon, 11.5% hydrogen, 17.7% nitrogen and 17.7% silicon.

Infrared analysis showed absorptions for NC—H at 2795 cm.$^{-1}$, for $SiCH=CH_2$ at 1590 cm.$^{-1}$, for Si—$CH_3$ at 1250 cm.$^{-1}$ and for Si—N at 980 cm.$^{-1}$.

(C) Preparation of vinyltris(dimethylamino)silane

The same method as used in (A) was followed here. 413 g. (2.56 moles) of vinyltrichlorosilane in 3 liters of pentane gave 266 g. (1.74 moles) of vinyltris(dimethylamino)silane, a 68% yield, having a boiling point of 82° C. at 30 mm. of Hg, a refractive index of $N_D^{25}$ 1.4447 and a specific gravity of $d_4^{25}$ 0.8634.

Infrared analysis showed absorptions for NC—H at 2790 cm.$^{-1}$, for $SiCH=CH_2$ at 1585 cm.$^{-1}$, and for SiN at 975 cm.$^{-1}$.

Nuclear magnetic resonance spectrum showed tau values for N—$CH_3$ at 7.57 and for $SiCH=CH_2$ at 4.39 in a ratio of 18/3.1.

Elemental analysis showed 51.0% carbon, 11.3% hydrogen, 22.3% nitrogen and 14.93% silicon, calculated for $CH_2=CHSi[N(CH_3)_2]_3$, 51.2% carbon, 11.3% hydrogen, 22.4% nitrogen and 14.98% silicon.

(D) Preparation of sym.-divinyltetramethyl-N-methyldisilazane

The method as described in (A) was used except that methylamine was used in place of dimethylamine. 724 g. (6.00 moles) of vinyldimethylchlorosilane in 2.5 liters of pentane gave 387 g. (1.94 moles) of sym.-divinyltetramethyl-N-methyldisilazane, a 64.8% yield, having a boiling point of 116° C. at 100 mm. of Hg, a refractive index of $N_D^{25}$ 1.4490 and a specific gravity of $d_4^{25}$ 0.8352.

Infrered analysis showed absorptions for NC—H at 2800 cm.$^{-1}$, for $SiCH=CH_2$ at 1595 cm.$^{-1}$, for Si—$CH_3$ at 1250 cm.$^{-1}$, and for Si—N at 910 cm.$^{-1}$.

Nuclear magnetic resonance spectrum showed tau values for Si—$CH_3$ at 9.87, for $NCH_3$ at 7.52 and for $SiCH=CH_2$ at 4.6–3.5 in the ratio of 12.0/3.0/6.1.

Elemental analysis showed 54.6% carbon, 10.7% hydrogen, 7.05% nitrogen and 28.7% silicon; calculated for

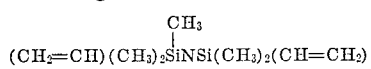

54.2% carbon, 10.6% hydrogen, 7.02% nitrogen and 28.2% silicon.

PREPARATIONS

The following examples were usually carried out in dry bottles which were fitted with stoppers through which two glass tubes were placed. One tube was closed with a septum so reagents could be added and samples removed by means of a hypodermic syringe. The other tube was used to maintain a slight pressure of helium in the system. The contents of each bottle were stirred by a magnetic stirrer or were shaken.

EXAMPLE 1

A 500 ml. flask was fitted with a condenser, stirrer, thermometer and dropping funnel. A solution of 0.30 mole of n-butyllithium in 190 ml. of hexane was placed in the flask and cooled to 2° C. 38.8 g. (0.30 mole) of vinyldimethyl(dimethylamino)silane was added to the stirred n-butyllithium solution through the dropping funnel slowly enough that the solution did not increase in temperature above 3° C. The atmosphere of the system was nitrogen at all times. The addition of the silane took 1.5 hours. After the addition of the silane, the solution was stirred for 3 hours while maintaining the temperature at 2° to 3° C. very little reaction had taken place at the end of this time as indicated by vapor phase chromatography and very little salt formation. The n-butyl-lithium had not reacted with the silane. 75 ml. of diethylether was slowly added to the solution. One and one-half hours after the addition of the diethylether 50% of the silane had disappeared and in an additional one hour 90% of the silane had disappeared. The product of the reaction was

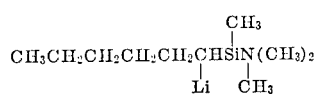

To this product, 50 ml. (1.25 moles) of methanol was added slowly to keep the temperature as near 5° C. as possible. The solution was then allowed to stand for 58 hours at room temperature before it was filtered and distilled. The product was isolated and identified as

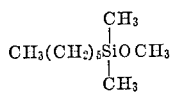

having a boiling point of 71° C. at 10 mm. of Hg and refractive index of $N_D^{25}$ 1.4145. This affirmed the structur of the (lithium hexyl) dimethyl(dimethylamino)silane.

EXAMPLE 2

In an apparatus as described in Example 1, to a stirred solution of 0.30 mole of n-butyllithium in 190 ml. of hexane at 22.5° C., 38.8 g. (0.30 mole) of vinyldimethyl (dimethylamino)silane was added during 1.5 hours. An exothermic reaction occurred which raised the temperature gradually to 41° C. No precipitate of $LiN(CH_3)_2$ was formed. All of the silane had disappeared 0.5 hour after the addition was complete. The product was a polymer of the formula

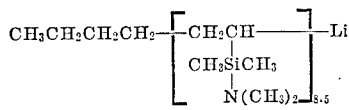

EXAMPLE 3

An organolithium(dimethylamino)silicon compound was prepared by placing 3.5 g. (0.027 mole) of vinyldimethyl(dimethylamino)silane in a 1 ounce vial under a helium atmosphere. The n-butyllithium was added with a syringe. The n-butyllithium was added in the form of a hexane solution which was 15 weight percent n-butyllithium, in an amount of 0.2 cc. (0.0003 mole). The solution turned yellow and grew warm when the n-butyllithium was added. The solution became opaque and a considerable amount of precipitate formed, which redissolved after a few minutes of shaking. A second injection of 0.2 cc. of the n-butyllithium solution caused the mixture to grow warm but no precipitate formed although the mixture became viscous. The volatiles were removed from the solution by heating with a heat lamp while under 5 mm. of Hg pressure. The resulting product was crystalline having a melting point of 90–95° C. The product was very soluble in pentane. The formula of the product was

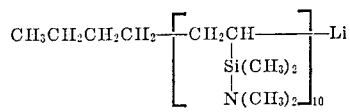

The infrared analysis showed the following absorptions typical of N—$CH_3$ at 2796 cm.$^{-1}$, Si—$CH_3$ at 1249 cm.$^{-1}$, and Si—N at 988 cm.$^{-1}$. There was no indication of Si—O or N—H. The nuclear magnetic resonance showed peaks for N—$CH_3$ at 7.60 tau, C—H aliphatic at 8.87 tau and Si—$CH_3$ at 9.92 tau. There was no vinyl unsaturation present. The proton ratio of Si—$CH_3$ to aliphatic to $N(CH_3)_2$ was 6.0 to 4.02 to 5.96. The elemental analysis calculated for

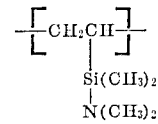

is 21.7% Si, 55.7% C, 11.7% H and 10.8% N; found 20.8% Si, 55.25% C, 11.12% H and 9.72% N.

EXAMPLE 4

In a 4-ounce bottle, 10.4 g. (0.1 mole) of styrene, 3.4 g. (0.026 mole) of vinyldimethyl(dimethylamino)silane, 30 ml. of hexane and 1.0 ml. of tetrahydrofuran were placed under an atmosphere of helium. To the resulting solution, 0.7 cc. (0.0011 mole) of n-butyllithium was added in the form of a 15 weight percent hexane solution. The solution immediately turned orange, indicating the formation of the

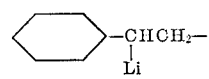

group, and slowly increased in viscosity during the next three hours. Vapor phase chromatography showed that all of both of the unsaturated compounds had disappeared at the end of three hours. The bottle was then opened to the air and the color disappeared. The volatiles were removed by warming at 50° C. while under a vacuum of 5 mm. of Hg. The resulting product was a write crystalline, brittle polymer having a melting point range of 88° to 100° C. Thirteen grams of the product was recovered which was a 94 yield. The product was a polymer of the formula

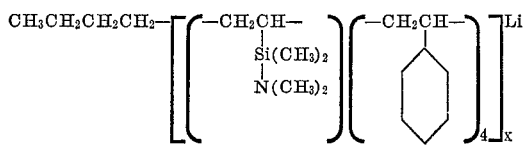

Elemental analysis calculated for a polymer of 1 silane units and 4 styrene units is 5.15% silicon, 83.6% carbon, 8.68% hydrogen and 2.56% nitrogen. The elemental analysis showed 4.94% silicon, 83.1% carbon, 9.16% hydrogen and 2.62% nitrogen.

Infrared analysis showed absorptions for $N(CH_3)_2[C—H$ stretch]

at 2792 cm.$^{-1}$, Si—N at 985 cm.$^{-1}$, $(CH_3)_2$Si at 1242 cm.$^{-1}$ and at 810–830 cm.$^{-1}$, C—N at 1280 cm.$^{-1}$, and 1165 cm.$^{-1}$,

at 1598 cm.$^{-1}$, 1490 cm.$^{-1}$ and 1488 cm.$^{-1}$, and C—H in

at 698 cm.$^{-1}$.

The product copolymer was completely soluble in cold hexane, benzene and tetrahydrofuran.

A portion of the copolymer, 5.2 grams, was dissolved in tetrahydrofuran and made acidic by adding hydrochloric acid in the form of a dilute solution (1 part by volume concentrated hydrochloric acid and 4 parts by volume water). The solution was boiled for 3 hours and then the solvent was boiled away. The residue was dissolved in 80 cc. of diethyl ether. The ether solution was washed with water until the wash water was neutral to indicator paper. The ether was removed by heating on a steam bath and the product was then dried for 3 days in a 128° C. oven. 4.3 grams were recovered which is a 89.6% yield. The polymer became slightly soft at 125° C. and fluid at 260° C. The polymer was extracted with refluxing toluene in a Soxhlet extractor for 4 days. No soluble material was recovered. The polymer was completely insoluble.

The polymer had a formula of

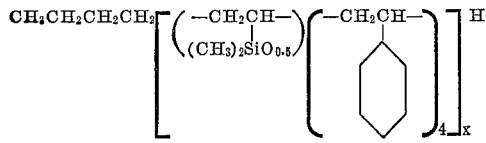

The elemental analysis calculated for the above was 5.5% silicon, 84.7% carbon and 8.1% hydrogen. The elemental analysis found 5.92% silicon, 83.4% carbon and 8.15% hydrogen.

EXAMPLE 5

In a 4-ounce bottle, 30 cc. of hexane, 1.3 g. (0.01 mole) of vinyldimethyl(dimethylamino)silane and 11.8 g. (0.10 mole) of alpha-methylstyrene was placed under a helium atmosphere. The solution was cooled to −2° C. and 0.4 cc. of a 15% solution of n-butyllithium in hexane was added. No apparent reaction took place. To this solution 6 ml. of tetrahydrofuran was added. The solution turned a pale yellow. More n-butyllithium was added to increase the amount of n-butyllithium to 0.0022 mole. The solution turned a bright red. The solution was kept at 0° C. for three hours and then allowed to increase slowly to room temperature. The solution remained red during the entire period. Vapor phase chromatography showed that all the vinyldimethyl(dimethylamino)silane had reacted and 50% of the alpha-methylstyrene had reacted. The temperature was lowered to 0° C. and held at this temperature for 4 hours. At the end of this period 70% of the alpha-methylstyrene had reacted.

The volatiles were then removed by reduced pressure (2–3 mm. of Hg) while warming with a heat lamp. The resulting product was a brittle, crystalline polymer having a melting point of 92° to 95° C. The amount of polymer recovered was 8.0 g., a 60% yield. The product had a formula of

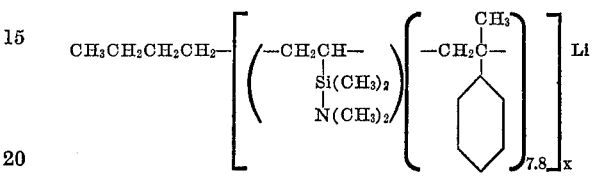

The elemental analysis calculated for 1 silane and 7.8 alpha-methylstyrene units was 2.67% silicon, 87.08% carbon, 1.33% nitrogen and 8.92% hydrogen; found by elemental analysis 2.93% silicon, 86.45% carbon, 8.77% hydrogen and 0.92% nitrogen.

EXAMPLE 6

In a 4-ounce bottle, 50 cc. of hexane, 13.6 g. (0.20 mole) of isoprene and 6.5 g. (0.05 mole) of vinyldimethyl (dimethylamino)silane was placed under a nitrogen atmosphere. n-Butyllithium in hexane was added to provide 0.0032 mole of n-butyllithium. The temperature was 25° C. The solution turned yellow and a white precipitate formed. After 3 hours most of the starting materials remained unreacted as shown by gas liquid chromatography. 2 cc. of tetrahydrofuran was added. The color of the solution deepened but no exotherm was observed. After one hour 0.0032 mole of n-butyllithium was added. The temperature rose to 40° C. and both monomers disappeared in a few minutes. The soluble polymer had the following formula

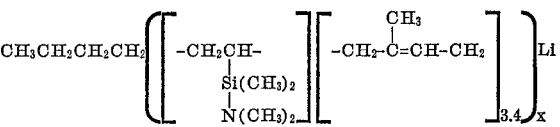

The hexane solution of the copolymer was washed with water to remove the lithium and then the hexane was evaporated by heating on a steam bath. The viscous residue was dissolved in tetrahydrofuran and acidified with dilute hydrochloric acid until the solution became cloudy. The solution was then boiled for five hours on a hot plate. The water and tetrahydrofuran were then removed by heating on a steam bath. The product was a viscous polymer. The polymer was dissolved in pentane and then washed with water again. The pentane was removed by heating on a hot plate and placed in an oven at 130°–160° C. for 2 hours at 1–2 mm. of Hg. A hard plastic material remained which was completely insoluble in pentane. The product was a partially hydrolyzed polymer having the following units

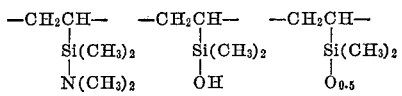

and

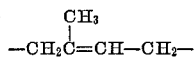

The elemental analysis showed 77.15% carbon, 11.32% hydrogen, 129% nitrogen, 8.62% silicon and 1.09% hydroxyl groups.

EXAMPLE 7

In a 2-ounce bottle under a helium atmosphere at room temperature, 16.5 g. (0.104 mole) of vinylmethyl-bis-(dimethylamino)silane were placed. To the silane 0.004 mole of n-butyllithium in the form of a 15% hexane solution was added over a 10 minute period. An exothermic reaction occurred and the liquid became viscous. After 30 minutes no further changes took place. The volatiles were removed from the viscous product by reduced pressure.

The residue was poured into 200 ml. of methanol. White crystals formed immediately. The crystals were recovered by filtering and then dried for four hours under 5 mm. of Hg. 5.5 g. of product was recovered which is a yield of 33%. The product had a melting point greater than 300° C. and showed some discoloration in air at 250° C. in air. The polymer was partially soluble in hexane and tetrahydrofuran and completely soluble in benzene. The polymer had the following formula $$CH_3CH_2CH_2CH_2 - \left( \begin{array}{c} -CH_2CH- \\ | \\ SiCH_3 \\ / \quad \backslash \\ (CH_3)_2N \quad N(CH_3)_2 \end{array} \right)_x Li$$

before the addition of the methanol and the same formula after the addition of the methanol except that a hydrogen atom replaced the lithium atom.

Infrared analysis showed no vinyl, SiOMe or SiOSi but did show absorptions for N—C—H (C—H stretch) at 2792 cm.$^{-1}$. N(CH$_3$)$_2$ at 1247 cm.$^{-1}$. SiCH$_3$ at 1170 cm.$^{-1}$, N—C at 1290° cm.$^{-1}$ and Si—N at 985 cm.$^{-1}$ The calculated elemental percentages for the

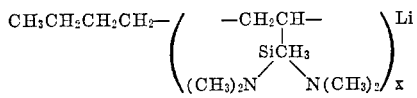

unit were 53.1% carbon, 11.4% hydrogen, 17.7% nitrogen and 17.7% silicon. The elemental analysis showed 52.7% carbon, 11.89% hydrogen, 16.05% nitrogen and 17.8% silicon.

Nuclear magnetic resonance analysis in carbon tetrachloride showed N—CH$_3$ at 7.54 tau, SiCH$_3$ at 9.87 tau and the typical complex peaks of a saturated aliphatic chain.

EXAMPLE 8

Example 7 was repeated using 32 g. (0.2 mole) of vinylmethylbis(dimethylamino)silane and 0.011 mole of n-butyllithium in the form of a 15% solution in hexane. The solution was allowed to stand for 16 hours and was then diluted with 20 cc. of hexane and poured into 500 cc. of methanol. The white crystalline precipitate was removed by filtration and devolatillized at 5 mm. of Hg at 25° C. for 24 hours. 15.2 g. of white crystals were recovered which is a yield of 47.3%. The infrared analysis was identical to that of Example 7. The silicon content was determined and found to be 17.9% which agreed with the product of Example 7.

EXAMPLE 9

Vinylmethylbis(dimethylamino)silane (7.9 g., 0.05 mole) was placed in a 4-ounce bottle under a helium atmosphere with hexane (40 cc.) and tetrahydrofuran (65 cc.) and then treated with a sloution of n-butyllithium in hexane (3.0 cc., 0.0048 mole of n-butyllithium) at 25° C. The solution became warm increasing the temperature to 28° C. The system was checked by vapor phase chromatography after 10 minutes had passed and only a small fraction of the silane had disappeared. Styrene (22 ml. 0.2 mole) was added slowly over a two hour period. Vapor phase chromatography during the addition of the styrene showed no unreacted styrene at any time and a gradually decreasing amount of unreacted silane. The solution was very viscous. The volatiles were removed by heating at 100° C. at 1–2 mm. of Hg until most of the volatiles were removed and then the residue was held at 1–2 mm. of Hg at 25° C. for seven days. 24.7 g. of a brittle, hard solid was recovered which is a yield of 86% of theory. The product had a melting point range of 93°–105° C. The copolymer had a formula of

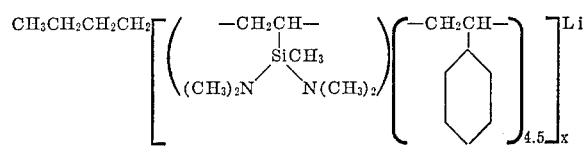

The infrared analysis showed absorptions of N(CH$_3$)$_2$ at 2795 cm.$^{-1}$, C—C (both aromatic) at 1599 cm.$^{-1}$,

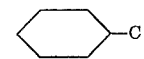

at 1490 cm.$^{-1}$, and 1450 cm.$^{-1}$, SiCH$_3$ at 1248 cm.$^{-1}$, SiN(CH$_3$)$_2$ at 1280 cm.$^{-1}$ and 1170 cm.$^{-1}$, Si—N at 975 cm.$^{-1}$ and

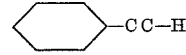

at 672 cm.$^{-1}$.

The elemental analysis showed 82.05% carbon, 9.15% hydrogen, 4.54% silicon and 4.17% nitrogen; calculated for 1 unit of silane to 4 units of styrene the analysis was 82.38% carbon, 8.68% hydrogen, 4.47% silicon and 4.47% nitrogen.

EXAMPLE 10

In an 8-ounce bottle under a helium atmosphere, triethylamine (40 cc.) and vinylmethylbis(dimethylamino)silane were placed. To this solution, 10 cc. of a solution of 15% n-butyllithium in hexane was added (0.0056 mole of n-butyllithium) in 1 cc. portions. With the addition of each portion of n-butyllithium a slight exotherm occurred and a small amount of crystals would precipitate. The product (50% monomer reacted) was the same as product of Example 7.

EXAMPLE 11

In a 4-ounce bottle under a helium atmosphere, 40 cc. of reagent grade, thiophene-free benzene which had been distilled from metallic sodium and 15.8 g. (0.10 mole) of vinylmethylbis(dimethylamino)silane were placed. To this solution, 2.0 cc. of a solution of 15% n-butyllithium in hexane (0.0032 mole of n-butyllithium) was added. The solution became warm and after 30 minutes the solution became opaque. After 24 hours at room temperature the bottle was half full of a white precipitate. Vapor phase chromatography showed that 30% of the silane had reacted. 2 cc. of the n-butyllithium solution was then added and after another 24 hours 50% of the monomer had reacted. The precipitate was recovered by filtering and was then added to methanol. The methanol was filtered off and then the residue was dried under 1 mm. of Hg for 3 days. 5.8 g. of a white solid was recovered, which was a yield of 37% of theory. Infrared analysis was identical to the product of Example 7.

The molecular weight as determined by freezing point depression was 677 which was in good agreement with x in Example 7 being 4 (690 g./mole).

EXAMPLE 12

When the following silanes are contacted with hexyllithium according to the method of Example 2, the compounds obtained are indicated as follows.

| Silane | Product |
|---|---|
| (a) CH$_2$=CH—CH=CH—Si[N(C$_6$H$_5$)$_2$]$_3$ | CH$_3$(CH$_2$)$_5$$\left[\begin{array}{c}\text{CH}_2\text{—CH=CH—CH—}\\|\\ [(\text{C}_6\text{H}_5)_2\text{N}]_3\text{Si}\end{array}\right]_{25}$Li |
| (b) CH$_2$=CH—CH=CH—CH$_2$CH$_2$Si[N—CH$_2$CH$_2$CHCH$_2$Si(CH$_3$)$_2$]$_3$ with CH$_3$, CH$_3$, CH$_2$CH=CH$_2$ substituents | CH$_3$(CH$_2$)$_5$$\left[\begin{array}{c}\text{—CH}_2\text{—CH=CH—CH—}\\ |\\ \text{CH}_2\\ \text{CH}_2\text{=CHCH}_2 \quad \text{CH}_3 \quad \text{CH}_3 \quad \text{CH}_2\\ [(\text{CH}_3)_2\text{SiCH}_2\text{CHCH}_2\text{CH}_2\text{N}]_3\text{Si}\end{array}\right]_{15}$Li |
| (c) 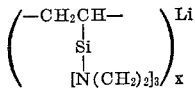 | CH$_3$(CH$_2$)$_5$$\left[\begin{array}{c}\text{CH}_3\\|\\ \text{—CH}_2\text{—C—}\\ |\\ \bigcirc\\ |\\ \text{Si—CH}_2\text{N(CH}_3)_2\\ |\\ [\text{N(CH}_3)_2]_2\end{array}\right]_{90}$Li |
| (d) 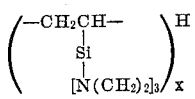 | CH$_3$(CH$_2$)$_5$$\left[\begin{array}{c}\text{—CH}_2\text{—CH=CH—C—}\\ |\quad\quad\quad\quad\backslash\\ \text{CH}_2\quad\quad\text{Si(CH}_3)_2\\ \quad\quad\quad |\\ \quad\quad\quad\text{N(CH}_3)_2\end{array}\right]_{18}$Li |

EXAMPLE 13

In a two-ounce vial fitted with a rubber septem, 10.4 g. (0.056 mole) of vinyltris(dimethylamino)silane were placed under a helium atmosphere. To the silane, 3.0 cc. of a 15% solution of n-butyllithium in hexane was added over a one hour period (0.0048 mole of n-butyllithium). Each addition of the n-butyllithium caused the temperature to increase several degrees. The viscosity increased. After 20 hours at 25° C. no further increase in viscosity occurred. The solution was then cooled in Dry Ice and 1.0 cc. of the solution of n-butyllithium in hexane was added (0.0016 mole of n-butyllithium). After one-half hour, no further increase in viscosity occurred. The resulting polymer had a formula $$\left(\begin{array}{c}\text{—CH}_2\text{CH—}\\|\\ \text{Si}\\|\\ [\text{N(CH}_2)_2]_3\end{array}\right)_x\text{Li}$$

The polymer was poured into 100 ml. of methanol, the liquid phase containing the polymer was separated and then devolatilized by reducing the pressure to 2 mm. of Hg at 25° C. for 5 hours. Four grams of a slow flowing liquid was recovered having a formula $$\left(\begin{array}{c}\text{—CH}_2\text{CH—}\\|\\ \text{Si}\\|\\ [\text{N(CH}_2)_2]_3\end{array}\right)_x\text{H}$$

The elemental analysis showed 53.35% carbon, 11.93% hydrogen, 15.05% silicon and 20.85% nitrogen. The percentages calculated for a

[(CH$_3$)$_2$N]$_3$SiCHCH$_2$— unit are 51.35% carbon, 11.23% hydrogen, 22.45% nitrogen and 14.97% silicon. The percentages calculated for $x=6.7$ are 52.68% carbon, 11.57% hydrogen, 21.45% nitrogen and 14.30 silicon.

Nuclear magnetic resonance showed N—CH$_3$ hydrogens to aliphatic C—H hydrogens in a ratio of 18 to 5.5. The average value of $x$ was therefore 6.7. No Si—OH or N—H were found.

EXAMPLE 14

In a bottle under a helium atmosphere, 11.8 g. (0.10 mole) of alpha-methylstyrene, 4.7 g. (0.025 mole) of vinyltris(dimethylamino)silane and 30 cc. of hexane was placed and then 2.0 cc. of a hexane solution of n-butyllithium (0.0032 mole) was added. The solution was cooled in a carbon tetrachloride bath cooled with enough Dry Ice to maintain the temperature between —20° to —25° C. After 20 hours, 2.0 cc. of tetrahydrofuran was added to the orange solution and then 2.0 cc. of n-butyllithium solution was added whereupon the solution turned orange-red. After another hour the solution was allowed to warm to room temperature and remained at room temperature for 6 days. A polymer of the following formula was obtained:

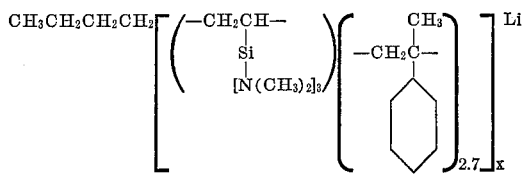

This polymer was precipitated in tertiary butyl alcohol, dissolved in tetrahydrofuran and then boiled with dilute hydrochloric acid for four hours. Most of the water and tetrahydrofuran were removed by heating on a steam bath until a precipitate began forming. Water was added and the mixture was allowed to stand for three days. The water was then removed and a gummy solid remained which was soluble in tetrahydrofuran. The gummy solid was redissolved in tetrahydrofuran and water was added to precipitate the product. After several days, 7.7 grams of a white brittle solid polymer was collected by filtering. The polymer had a softening point range of 180° to 210° C.

A sample of the polymer was heated to 300° C., cooled and then it showed a softening point of 285° C. The resulting product was soluble in benzene. The product was pulverized, heated at 100° C. under 1 to 2 mm. of Hg for 6 hours. The product was still soluble in cold benzene.

5.7 g. of the polymer in 300 ml. of toluene was refluxed for two days. A drop of tetramethylguanidine octoate was added as a silanol condensation catalyst and then the solution was refluxed for 6 days at 110° C. The product was still soluble. Two crystals of

[KOSi(CH$_3$)$_2$]$_2$O was then added and refluxing was continued for one additional day. The solution was cooled and filtered whereupon 0.35 g. of an insoluble material was obtained. The toluene soluble portion was then allowed to stand after methanol was added. A white crystalline solid formed gradually, total, 4.9 g. The white crystalline solid was dried for 24 hours at 5–10 mm. of Hg. The dried product had a melting point of 180° C.

Infrared analysis of the polymer showed absorptions for C—C (aromatic) at 1598 cm.$^{-1}$, for $C_6H_5$— C at 1442 cm.$^{-1}$, and 1495 cm.$^{-1}$, for SiOSi (broad) centered at 1110 cm.$^{-1}$ and for C—H (aromatic) at 697 cm.$^{-1}$. No evidence of $N(CH_3)_2$ or SiOH were found.

The elemental analysis showed 6.95% silicon, 78.25% carbon, 8.31% hydrogen and 6.49% oxygen.

The percentages calculated for a polymer having 2.7 units of $$-CH_2\overset{|}{C}(CH_3)(C_6H_5)$$

and 1 unit of $$-CH_2\overset{|}{C}HSiO_{1.5}$$

are 79.32% carbon, 7.60% hydrogen, 7.04% silicon and 6.04% oxygen.

The above analysis and nuclear magnetic resonance are consistent with the formula $$CH_3CH_2CH_2CH_2\left[\left(\begin{array}{c}-CH_2CH-\\ |\\ SiO_{1.5}\end{array}\right)\left(\begin{array}{c}CH_3\\ |\\ -CH_2\overset{|}{C}-\\ \bigcirc\end{array}\right)_{2.7}\right]_x H$$

EXAMPLE 15

In a four-ounce bottle under a helium atmosphere, 40 cc. of hexane, 5.0 cc. of tetrahydrofuran and 8.63 g. (0.046 mole) of vinyltris(dimethylamino)silane were placed. 3.0 cc. of a 15% n-butyllithium in hexane was added (0.0048 mole) to the solution. The solution turned a pale yellow and a slight exotherm was observed. 8.2 g. of styrene was added slowly by dripping it into the solution from a hypodermic syringe over a period of 1.5 hours, while the bottle was being agitated. A precipitate began forming and the solution was allowed to stand overnight. The liquid phase was separated from the precipitate and the precipitate was dissolved in benzene. The formula of the product was $$CH_3CH_2CH_2-$$

$$CH_2\left[\left(\begin{array}{c}-CH_2CH-\\ |\\ Si\\ |\\ [N(CH_3)_2]_3\end{array}\right)\left(\begin{array}{c}-CH_2CH-\\ |\\ \bigcirc\end{array}\right)_9\right]_x Li$$

The benzene solution was poured into methanol. Fluffy white crystals formed and were filtered from the solution. The crystals were dried under reduced pressure of 5 mm. of Hg for 2 hours. 9.0 g. of white crystalline product was recovered, which softened at 100° C.

Elemental analysis showed 86.45% carbon, 8.50% hydrogen, 2.81% nitrogen and 2.54% silicon. The percentages calculated for nine units of $$-CH_2\overset{|}{C}HC_6H_5$$

and one unit of $$-CH_2\overset{|}{C}HSi[N(CH_3)_2]_3$$

are 85.43% carbon, 8.34% hydrogen, 2.49% silicon and 3.75% nitrogen.

Infrared analysis showed absorptions for N—$CH_3$ at 2790 cm.$^{-1}$, for C—C (aromatic) at 1600 cm.$^{-1}$, for $C_6H_5$—C at 1450 cm.$^{-1}$ and 1490 cm.$^{-1}$, for C—N at 1280 cm.$^{-1}$, and 1170 cm.$^{-1}$, for Si—N at 980 cm.$^{-1}$ and for $CH_3$—C at 1375 cm.$^{-1}$. There was no evidence of $SiOCH_3$ or SiOSi.

The above analysis and nuclear magnetic resonance was consistent with the following formula $$CH_3CH_2CH_2CH_2\left[\left(\begin{array}{c}-CH_2CH-\\ |\\ Si\\ |\\ [N(CH_3)_2]_3\end{array}\right)\left(\begin{array}{c}-CH_2CH-\\ |\\ \bigcirc\end{array}\right)_9\right]_x H$$

EXAMPLE 16

10 g. (0.05 mole) of $$CH_2=CH\underset{\underset{CH_3}{|}}{\overset{\overset{CH_3}{|}}{Si}}-N-\underset{\underset{CH_3}{|}}{\overset{\overset{CH_3}{|}}{Si}}-CH=CH_2$$

and 10 cc. of hexane were placed in a 4-ounce bottle fitted with a self sealing rubber septem. To the solution at room temperature, 1.0 cc. of a 15% n-butyllithium in hexane was added (0.0016 mole). After 2 days, another 10 cc. of the n-butyllithium solution was added. After an additional 4 hours another 2.0 cc. of the n-butyllithium solution was added. The solution was allowed to stand for 48 hours. The product was a benzene insoluble polymer having the units of the following formula $$-CH_2\underset{\underset{CH_3}{|}}{\overset{\overset{CH_3}{|}}{C}}HSi-N-\underset{\underset{CH_3}{|}}{\overset{\overset{CH_3}{|}}{Si}}CHCH_2-$$

The polymer was terminated by $CH_3CH_2CH_2CH_2$— radicals and Li atoms. The mixture of polymer and solvent was washed with two-100 ml. of methanol. The liquid was decanted and the polymer was dried at 25° C. under 1 mm. of Hg for 20 hours. 7.2 g. of polymer was recovered. The polymer was insoluble in benzene and did not melt up to 300° C.

Infrared analysis showed absorptions for N—$CH_3$ at 2805 cm.$^{-1}$, for C—C at 1455 cm.$^{-1}$, for Si—$CH_3$ at 1245 cm.$^{-1}$, for N—C at 1140 cm.$^{-1}$ and 1060 cm.$^{-1}$, for Si—N—Si at 880 cm.$^{-1}$. There was no evidence for Si—CH=$CH_2$, $SiOCH_3$ or N—H.

Elemental analysis showed 54.05% carbon, 11.04% hydrogen, 7.22% nitrogen and 26.80% silicon. The percentages calculated for a unit of $$-CH_2\overset{|}{C}HSi(CH_3)_2NSi(CH_3)_2\overset{|}{C}HCH_2-$$

are 54.27% carbon, 10.55% hydrogen, 7.04% nitrogen and 28.14% silicon.

EXAMPLE 17

In an 8-ounce bottle fitted with a self-sealing rubber septem, 70 cc. of hexane and 2.0 cc. of solution of 15% n-butyllithium in hexane (0.0032 mole) were placed. To the solution, 8.76 g. (0.044 mole) of $$CH_2=CH\underset{\underset{CH_3}{|}}{\overset{\overset{CH_3}{|}}{Si}}-N-\underset{\underset{CH_3}{|}}{\overset{\overset{CH_3}{|}}{Si}}CH=CH_2$$

was added. After 48 hours at room temperature, 10 cc. of triethylamine and 1.0 cc. of the n-butyllithium solution was added. After 5 days at ambient temperature the following polymer was obtained $$CH_2CH_2CH_2CH_2-\left[\begin{array}{c}CH_2\\ -CH_2\overset{|}{C}H\quad \overset{|}{C}H-\\ \overset{|}{CH_3}\underset{|}{\overset{|}{Si}}\quad \underset{|}{\overset{|}{Si}}\overset{|}{CH_3}\\ CH_3\quad N\quad CH_3\\ |\\ CH_3\end{array}\right]_x Li$$

The polymer was poured into 300 ml. of methanol. The precipitate was isolated by filtration and devolatilized at 25° C. under 2 mm. of Hg for 3 days. A yield of 4.2 g. of a white solid (47% of theory) was obtained having a melting point of 70° to 75° C. The molecular weight was 2600 as determined by vapor phase osmometry. The polymer was soluble in cold benzene or toluene. The X-ray analysis showed the polymer to be non-crystalline and to have a high degree of order in its molecular packing.

Infrared analysis showed absorptions for N—CH$_3$ at 2810 cm.$^{-1}$, for Si—CH$_3$ at 1245 cm.$^{-1}$, for N—C at 1170 cm.$^{-1}$, for C—N (ring) at 1140 cm.$^{-1}$, for C—N at 1072 cm.$^{-1}$, and for Si—N—Si at 880 cm.$^{-1}$.

Elemental analysis showed 55.35% carbon, 11.44% hydrogen, 7.17% nitrogen and 27.23% silicon. The percentages calculated for

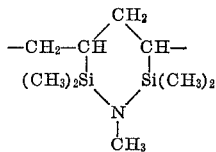

are 54.27% carbon, 10.55% hydrogen, 7.04% nitrogen and 28.14% silicon.

The analysis is consistent with the formula

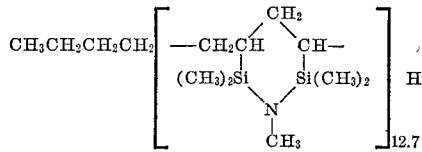

average molecular weight 2585 g./mole.

EXAMPLE 18

A copolymer of styrene and

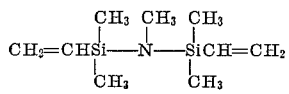

was prepared by dissolving 10 g. (0.050 mole) of

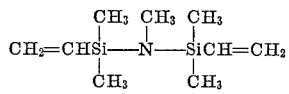

in 40 cc. of toluene and placing them in a 4-ounce bottle under a helium atmosphere. To the resulting clear solution, 3.0 cc. of a 15% solution of n-butyllithium in hexane (0.0048 mole) was added. Thereafter 7 ml. of styrene was added. The solution turned orange and became warm after several minutes. An additional 16 ml. of styrene was added to make the total 20 g. (0.2 mole). The solution increased in viscosity over a 30 minute period until it became a gelatinous mass. The temperature increased to 27° C. The polymer was insoluble in toluene and was composed of

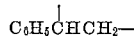

units and

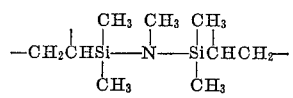

units in a ratio of 1.28 to 1 respectively, with $$CH_3CH_2CH_2CH_2—$$

radicals and Li atoms as endblockers. The gelatinous mass was diluted with toluene, broken up into small pieces and then soaked in methanol until the color had disappeared. The major portion of the solvent was removed by filtering and the remaining volatiles were then removed under reduced pressure of 5 mm. of Hg at 25° C. for 2 days. The yield was 16 g. (53% of theory). The polymer softened slightly at 130° C. but did not melt up to 300° C. The polymer was insoluble in carbon tetrachloride and benzene.

The elemental analysis showed 16.8% silicon, 68.95% carbon, 9.41% hydrogen and 4.37% nitrogen. The percentage calculated for 1.28

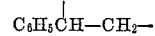

units and one

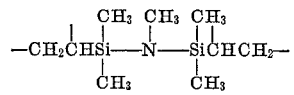

unit are 69.48% carbon, 16.84% silicon, 9.41% hydrogen and 4.21% nitrogen.

EXAMPLE 19

A soluble copolymer of styrene and

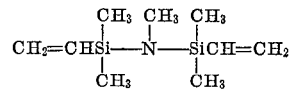

was prepared by mixing under a helium atmosphere in a 4-ounce bottle, 60 cc. of benzene, 10.9 g. (0.0544 mole) of

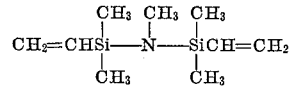

and 5.2 g. (0.05 mole) of styrene. Over a 20 hour period a solution of 15% n-butyllithium in hexane was added periodically until 3.0 cc. (0.0048 mole of n-butyllithium) had been added. Finally, 1.0 cc. of the n-butyllithium solution was added. The solution turned orange and an exotherm was observed. The product was a polymer composed of

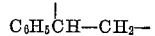

units and

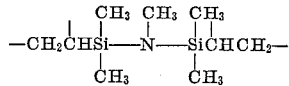

units, with CH$_3$CH$_2$CH$_2$CH$_2$— radicals and lithium atoms as endblockers. The polymer was soluble in cold toluene.

EXAMPLE 20

A polymer was prepared by mixing under a helium atmosphere in a 1-pint bottle, 100 cc. of benzene and 2.0 cc. of a solution of 15% n-butyllithium in hexane (0.0032 mole). To the solution, 15.8 g. (0.100 mole) of vinylmethylbis(dimethylamino)silane was added. After 3 hours an additional 2.0 cc. of the n-butyllithium was added. The mixture was allowed to stand for 24 hours at room temperature. At the end of the period, half the bottle was filled with a white suspension of polymer. The polymer was precipitated with methanol, filtered and dried under reduced pressure. The yield was 6.5 g. (41% of theory). Infrared analysis was the same as the product of Example 7. The product had a formula

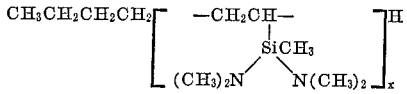

6.5 g. of the polymer was dissolved in cold benzene. A small amount of insoluble material (0.2 g.) was removed by filtering. To the clear filtrate 5.8 g. (0.096 mole) of glacial acetic acid was added. After 15 minutes, distilled water was added (0.065 g., 0.036 mole). The mixture was stirred for one hour. The mixture was then washed with water until the wash water was neutral to indicator paper. The polymer became partially insoluble when the mixture was made neutral and a flocculent precipitate appeared. Diethylether (100 ml.) was added to dissolve the precipitate.

The product solution was placed over potassium carbonate for four days at the end of the period the solution was clear. The solution was decanted from the potassium carbonate and the solvent was removed by evaporation. A viscous product resulted. The remaining volatiles were removed by stripping under reduced pressure of 2–5 mm. of Hg for 36 hours at 25° C. The polymer was a white brittle powder which was soluble in methanol and benzene.

Infrared analysis showed absorption for SiOH (very weak) at 3400 cm.$^{-1}$, for Si—CH$_3$ at 1255 cm.$^{-1}$, and for SiOSi (broad) centered at 970 cm.$^{-1}$. No N—CH$_3$ was detected.

Elemental analysis showed 42.45% carbon, 7.52% hydrogen, 28.30% silicon and 3.83% hydroxyl (SiOH).

The polymer had a formula $$CH_3CH_2CH_2CH_2-CH-CH_2-CH-[CH_2-CH]-CH_2-CH_2$$

(with CH$_3$/Si—O repeating units, terminated by Si—OH)

EXAMPLE 21

To a suspension of 13.0 g. (0.54 g. atom) of magnesium in 50 ml. of dry tetrahydrofuran was added dropwise a solution of 76.0 g. (0.50 mole) of chloromethyldimethylaminodimethylsilane in 200 ml. of dry tetrahydrofuran. The reaction began immediately and was maintained at reflux during the addition and heated at reflux for one hour after complete addition. The resulting black solution was filtered through glass wool yielding 255 ml. of a solution of 3.80 N (0.485 mole=97% yield) of (CH$_3$)$_2$NSi(CH$_3$)$_2$CH$_2$MgCl. The concentration of the Grignard reagent was determined by a normal back-titration method. A 1.00 ml. aliquot of the Grignard reagent was back-titrated with 38.00 ml. of a 0.1 N HCl solution, thus the normality was 3.80 N and the molarity was 1.90 M.

The nuclear magnetic resonance spectrum of the Grignard reagent in tetrahydrofuran showed the following absorptions confirming its structure. All the peaks were sharp singlets.

| | Tau values |
|---|---|
| Si—CH$_2$—Mg—X | 11.62 |
| (CH$_3$)$_2$Si | 10.11 |
| (CH$_3$)$_2$N | 7.64 |

To a solution of 0.05 mole of (CH$_3$)$_2$NSi(CH$_3$)$_2$CH$_2$MgCl in 50 ml. of diethyl ether was added with stirring 5 ml. (0.28 mole) of water. Gas liquid chromatographic analysis of the reaction mixture showed the only volatile product other than the solvent diethylether, was hexamethyldisoloxane, thus confirming the above structure.

EXAMPLE 22

To a solution of 0.05 mole of (CH$_3$)$_2$NSi(CH$_3$)$_2$CH$_2$MgCl 1.475 molar, was used to prepare other organometallic aminosilicon compounds.

(A) To 0.60 ml. of the above solution (0.00090 mole of the silane), 132 mg. (0.00045 mole) of (CH$_2$=CH$_2$)$_2$PtCl$_2$ was added. An exothermic reaction was observed. Nuclear magnetic resonance was used to determine the product which was (CH$_3$)$_2$NSi(CH$_3$)$_2$CH$_2$PtCl(CH$_2$=CH$_2$)$_2$. The tau value of 11.62 for SiCH$_2$MgCl disappeared and a tau value at 9.5 was observed.

(B) To 0.53 ml. of the above solution (0.00072 mole of the silane), 266 mg. (0.00036 mole) of

[(CH$_3$CH$_2$CH$_2$CH$_2$)$_3$P]$_2$PtCl$_2$ was added. An exothermic reaction was observed forming a clear green solution. Nuclear magnetic resonance was used to determine the product which was (CH$_3$)$_2$NSi(CH$_3$)$_2$CH$_2$PtCl[P(CH$_2$CH$_2$CH$_2$CH$_3$)$_3$]$_2$ The tau value of 11.62 for SiCH$_2$MgCl disappeared and a tau value at 9.5 was observed.

(C) To 1.00 ml. of the above solution (0.00150 mole of the silane), 102 mg. (0.00075 mole) zinc chloride was added. An exothermic reaction was observed giving a grey solution. Nuclear magnetic resonance showed the product was (CH$_3$)$_2$NSi(CH$_3$)$_2$CH$_2$ZnCl. The tau value of 11.62 for SiCH$_2$MgCl disappeared and a tau value at 10.88 was observed.

(D) To 1.00 ml. of the above solution (0.00150 mole of the silane), 67 mg. (0.00050 mole) of aluminum chloride was added. An exothermic reaction was observed. Nuclear magnetic resonance showed the product was (CH$_3$)$_2$NSi(CH$_3$)$_2$CH$_2$AlCl$_2$ The tau value of 11.62 for the SiCH$_2$MgCl disappeared and a tau value at 10.81 was observed.

(E) To 1.00 ml. of the above solution (0.00150 mole of the silane), 208 mg. (0.00075 mole) of PbCl$_2$ was added. An exothermic reaction was observed forming an orange solution. Nuclear magnetic resonance showed the product was (CH$_3$)$_2$NSi(CH$_3$)$_2$CH$_2$PbCl. The tau value of 11.62 for SiCH$_2$MgCl disappeared and tau values at 9.4 and 9.7 were observed.

EXAMPLE 23

To a suspension of 3.0 g. (0.13 g. atom) of magnesium in 40 ml. dry tetrahydrofuran, maintained at gentle reflux, was added dropwise a solution of 21.31 ml. (0.10 mole) of chloroisobutyldimethylaminodimethylsilane in 125 ml. dry tetrahydrofuran. After complete addition there was no evidence of the initiation of a reaction. Addition of small amounts of 1,2-dibromoethane and iodine also failed to immediately initiate the reaction. After seven hours of reflux a positive Gilman Color Test No. 1 indicated the presence of the Grignard. The solution was maintained in reflux for another 20 hours. The solution was filtered through glass wool yielding 187 ml. of a solution of 0.978 N (0.0914 mole=91% yield)

(CH$_3$)$_2$NSi(CH$_3$)$_2$CH$_2$CH(CH$_3$)CH$_2$MgCl

The concentration of the Grignard reagent was determined by normal back-titration methods.

Titration of a 3.00 ml. aliquot of the Grignard reagent by back titration methods was accomplished with 29.32 ml. of 0.1 N HCl; therefore Normality=0.978 N and Molarity=0.489 M.

The nuclear magnetic resonance spectrum of the Grignard in tetrahydrofuran showed the following absorptions confirming its structure.

—CH$_2$—Mg—X, 9.75 tau (singlet).
Me$_2$Si, 10.00 tau (singlet).
Si—CH$_2$, 9.06 tau (doublet).
Me—CH, 8.86 tau (doublet J=6.5 cps.).
Me$_2$N, 7.56 tau (singlet).
CH, masked by the upper band of tetrahydrofuran.

Therefore, the structure of the Grignard reagent is:

$$(CH_3)_2NSi-CH_2CHCH_2MgCl \quad \text{with } (CH_3)_2 \text{ on Si and } CH_3 \text{ on CH}$$

To a solution of 0.10 mole of (CH$_3$)$_2$NSi(CH$_3$)$_2$CH$_2$CH(CH$_3$)CH$_2$MgCl in 125 ml. tetrahydrofuran was added with stirring a solution of 11.5 ml. (0.10 mole) of $$CH_3\overset{O}{\overset{\|}{C}}-H$$

in 50 ml. of dry tetrahydrofuran. This reaction mixture was subsequently hydrolyzed via the addition of 100 ml.

dilute HCl. The hydrolysis mixture was extracted with 300 ml. dry diethylether from which two fractions were isolated by distillation. Analysis by nuclear magnetic resonance showed the first fraction to be a mixture of dimethyl-2-methylpropylsilanol and sym.-tetramethyl-bis-(2 - methylpropyl)-disiloxane. The second fraction was shown to contain pure sym.-tetramethyl-bis-(2-methylpropyl)-disiloxane, also by nuclear magnetic resonance, thus confirming the structure.

EXAMPLE 24

(A) In an apparatus having a three-necked flask, condenser, magnetic stirrer, condenser, addition funnel and protected from moisture by a CaSO₄ drying tube, 2.0 g. of magnesium turnings (0.08 mole) were placed. The apparatus was flame dried. 55 ml. of diethylether and 16.5 g. (0.05 mole) of

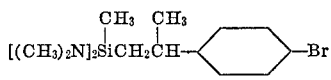

was added. The reaction did not begin so 30 ml. of the diethylether was removed by distillation and 30 ml. of tetrahydrofuran was added. At 45° C. an exothermic reaction began and produced a black solution and consumed the magnesium. The resulting product was

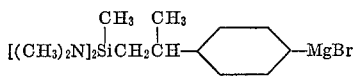

10 g. of methyliodide was added and a precipitate developed. The salts were filtered and washed with dry diethylether. The filtrate and wash were combined and concentrated.

The concentrate was hydrolyzed with water and distillation of the hydrolyzate yielded a mixture of

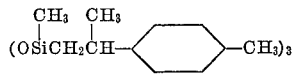

and

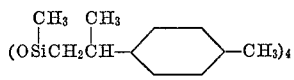

The products were identified by nuclear magnetic resonance.

(B) A solution of 0.05 mole of

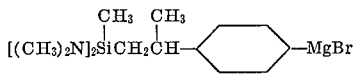

in tetrahydrofuran was prepared as described above in (A) and added to 0.15 mole of $(CH_3)_3SiCl$. The product was recovered as described above and was shown by nuclear magnetic resonance to be

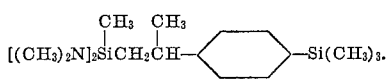

EXAMPLE 25

Vinylmethylbis(dimethylamino)silane (79 g., 0.50 mole), benzene (5 ml.) and n-butyllithium (0.026 mole) were mixed. The exothermic reaction was accompanied by the formation of a copious precipitate of polymer. After 4 hours vapor phase chromatographic analysis showed the disappearance of about 50% of the silane. The mixture was poured into methyl alcohol (700 ml.). The solid polymer was collected and devolatilized at 30° C. and 1 mm. of Hg affording a white solid (38 g., 49% yield) which did not melt up to 300° C. The polymer was soluble in benzene and had a molecular weight of 1600 (cryoscopic in benzene). The infrared spectrum gave characteristic absorptions for NC—H at 2790 cm.⁻¹, for Si—CH₃ at 1250 cm.⁻¹ and for Si—N at 980 cm.⁻¹. Elemental analysis showed 53.5% carbon, 12.1% hydrogen, 18.0% nitrogen and 18.0% silicon, calculated for $C_7H_{18}N_2Si$, 53.1% carbon, 11.4% hydrogen, 17.7% nitrogen and 17.7% silicon.

A portion of the polymer product (22.3 g.) was dissolved in benzene (400 ml.) and treated with acetic acid (36.0 g., 0.60 mole) causing an exotherm. Distilled water (2.6 g., 0.14 mole) was added to the stirred solution after 1 hour. The water was consumed almost immediately causing an exotherm. Ether was added and the material was washed with water. The organic phase was dried over anhydrous potassium carbonate and devolatilized giving a white powder (7.5 g., 62% yield) which was soluble in cold toluene and did not melt up to 300° C. The infrared spectrum showed characteristic absorptions for SiO—H at 3450 cm.⁻¹, for Si—CH₃ at 1260 cm.⁻¹ and for Si—O—Si at 960 cm.⁻¹.

The product was a polymer having a formula

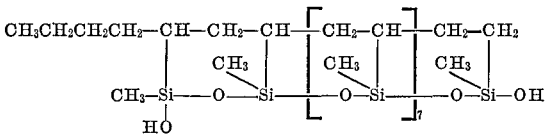

The elemental percentages calculated for this molecular formula are 42.8% carbon, 7.40% hydrogen, 29.5% silicon and 3.46% hydroxyl (SiOH); actually found were 41.7% carbon, 7.81% hydrogen, 29.9% silicon and 3.42% hydroxyl (SiOH).

EXAMPLE 26

(A) Vinyltris(dimethylamino)silane (18.7 g., 0.10 mole) was added slowly to n-butyllithium (0.11 mole) in hexane (70 ml.) after 0.5 hour, vapor phase chromatographic analysis showed only hexane and the silane. After 20 hours, 95% of the silane had disappeared; no volatile compound except hexane was present. The product at this point was

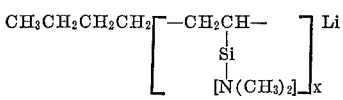

The clear solution of the polymer was cooled to 0° C. and treated with excess dimethylamine (16 g., 0.36 mole) which caused an exotherm and salt formation. After 0.5 hour excess amine was permitted to escape and lithium dimethylamide was removed from the solution. Vaporphase chromatography analysis showed no volatile product in the organic layer and only a small amount of the silane. Removal of volatiles at 80° C. and 1 mm. of Hg left a viscous liquid (19.7 g.).

Infrared analysis showed characteristic absorptions for NC—H at 2792 cm.⁻¹ and for Si—N at 982 cm.⁻¹. There was no evidence for $SiCH=CH_2$ or Si—O—Si.

(B) A solution of n-butyllithium (0.16×10⁻² mole) in vinyltris(dimethylamino)silane (10.5 g., 0.0560 mole) at ambient temperature for 20 hours noticeably increased in viscosity. The solution was cooled in Dry Ice and additional n-butyllithium (0.16×10⁻² mole) was added. No further change in viscosity occurred during one hour. The product was

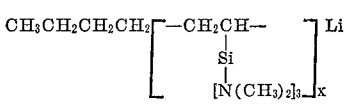

The solution of the product was poured into methyl alcohol. An oil separated and was collected and devolatilized at 25° C. and 2 mm. of Hg to yield a very viscous oil (4.0 g., 38% yield). Characteristic infrared absorptions were for NC—H at 2790 cm.⁻¹ and for Si—N at 988 cm.⁻¹. The nuclear magnetic resonance spectrum gave signals with tau values of 7.52 for NCH₃ and 8.6 for broad aliphatic in the ratio of 18/5.5 indicating an average degree of polymerization of 4.

Elemental analysis showed 53.4% carbon, 11.7% hydrogen, 20.9% nitrogen and 15.0% silicon; calculated for

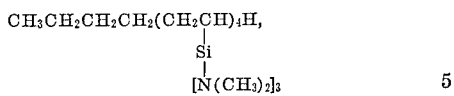

53.6% carbon, 11.7% hydrogen, 20.8% nitrogen and 13.9% silicon.

EXAMPLE 27

α-methylstyrene (11.8 g., 0.100 mole) and vinyltris(dimethylamino)silane (4.7 g., 0.25 mole) in hexane (30 ml.) and tetrahydrofuran (2 ml.) were cooled to −25° C. and treated with n-butyllithium (0.0012 mole) resulting in an orange-red solution. After 20 hours part of the α-methylstyrene disappeared but the silane remained mostly unreacted. After 6 days at ambient temperature the solution was still highly colored and about one-half of the α-methylstyrene and two-thirds of the silane had polymerized. Rapid loss of the orange-red color occurred when the system was opened to the atmosphere. The copolymer was composed of $$-CH_2CH-$$
$$\quad\quad |$$
$$\quad\quad Si$$
$$\quad\quad |$$
$$\quad\quad [N(CH_3)_2]_3$$

units, and $$-CH_2CH_3-$$

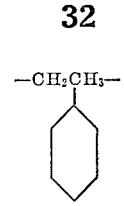

units in the ratio of 1 to 2.6, endblocked with butyl radicals and lithium atoms. The copolymer was precipitated in tert-butyl alcohol, dissolved in tetrahydrofuran and boiled with dilute HCl for 4 hours. A soft solid formed during this time. Drying at 100° C. for 6 hours at 1 mm. of Hg gave a brittle white solid (7.7 g.) which was soluble in benzene. The infrared spectrum showed a strong, broad band for SiOSi at 1110 cm.$^{-1}$. A barely detectable absorption for SiO—H at 3640 cm.$^{-1}$ indicated no more than a trace of uncondensed silanol.

Elemental analysis showed 78.5% carbon, 8.3% hydrogen and 7.1% silicon, calculated for one unit of $$-CH_2CH-$$
$$\quad\quad |$$
$$\quad\quad Si$$
$$\quad\quad |$$
$$\quad\quad [N(CH_3)_2]_3$$

and 2.6 units of $$-CH_2CH_3-$$

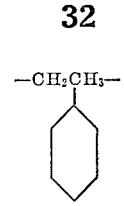

78.9% carbon, 7.5% hydrogen and 7.2% silicon.

EXAMPLE 28

When the following silanes are substituted for $$(CH_3)_2NSi(CH_3)_2CH_2Cl$$

of Example 20, the indicated compounds are obtained.

| Silane | Product |
|---|---|
| (a) ClCH$_2$CH$_2$Si[N(C$_2$H$_5$)$_2$]$_3$ | ClMgCH$_2$CH$_2$Si[N(C$_2$H$_5$)$_2$]$_3$ |
| (b) BrCH$_2$CH$_2$CH$_2$Si(N[C(CH$_3$)$_3$]$_2$)$_3$ | BrMgCH$_2$CH$_2$CH$_2$Si(N[C(CH$_3$)$_3$]$_2$)$_3$ |
| (c) ICH$_2$CH$_2$—⌬—Si[N(CH$_3$)(C$_6$H$_{11}$)]$_3$ | IMgCH$_2$CH$_2$—⌬—Si[N(CH$_3$)(C$_6$H$_{11}$)]$_3$ |
| (d) BrCH$_2$(CH$_2$)$_{17}$Si[N(CH$_3$)(naphthyl)]$_3$ | BrMgCH$_2$(CH$_2$)$_{17}$Si[N(CH$_3$)(naphthyl)]$_3$ |
| (e) ClCH$_2$(CH$_2$)$_{10}$Si[N(CH$_3$)CH$_2$CH$_2$CH$_2$CH$_2$N(CH$_3$)$_2$]$_3$ | ClMgCH$_2$(CH$_2$)$_{10}$Si[N(CH$_3$)CH$_2$CH$_2$CH$_2$CH$_2$N(CH$_3$)$_2$]$_3$ |
| (f) ClCH$_2$CH(CH$_3$)CH$_2$Si[N(CH$_2$CH$_2$CH$_2$OCH$_2$CH$_3$)$_2$]$_3$ | ClMgCH$_2$CH(CH$_3$)CH$_2$Si[N(CH$_2$CH$_2$CH$_2$OCH$_2$CH$_3$)$_2$]$_3$ |
| (g) Br—⌬—CH(CH$_3$)CH$_2$Si[C(CH$_3$)—⌬—Si(CH$_3$)$_3$]$_3$ | BrMg—⌬—CH(CH$_3$)CH$_2$Si[N(CH$_3$)—⌬—Si(CH$_3$)$_3$]$_3$ |
| (h) ClCH$_2$CH$_2$—⌬—Si[N(CH$_3$)Si(CH$_3$)$_3$]$_3$ | ClMgCH$_2$CH$_2$—⌬—Si[N(CH$_3$)Si(CH$_3$)$_3$]$_3$ |

EXAMPLE 29

When the following silanes are substituted for the vinyldimethyl(dimethylamino)silane of Example 2, equivalent results are obtained:

(a) CH$_2$=CHSi(CH$_2$CH$_2$CH$_2$CH$_3$)[N(CH$_3$)$_2$]$_2$ (b) CH$_2$=CHSi(CH$_2$CH—CH$_2$)[N(CH$_3$)$_2$]$_2$ (c) CH$_2$=CHSi(CH$_2$CH$_2$—⌬)[N(CH$_3$)(C$_2$H$_5$)]$_2$ (d) CH$_2$=CHSi(CH$_2$—⌬—OCH$_2$CH$_3$)[N(CH$_3$)CH$_2$Si(CH$_3$)$_3$]$_2$ (e) CH$_2$=CHSi(CH$_2$CH$_2$CH$_2$)[N(CH$_3$)$_2$]$_3$(C$_6$H$_5$)$_2$SiCH$_2$CH$_3$ (f) CH$_2$=CHSi(—⌬—⌬—)[N(CH$_3$)$_2$]$_2$ (g) CH$_2$=CHSi[N(CH$_3$)—Si(CH$_3$)$_2$CH$_2$CH$_2$CH$_2$N(CH$_3$)$_2$]$_3$

EXAMPLE 30

When $$CH_3CH_2CH_2CH_2CH_2CHSi(CH_3)_2[N(CH_3)_2]$$
$$\quad\quad\quad\quad\quad\quad\quad\quad\quad |$$
$$\quad\quad\quad\quad\quad\quad\quad\quad\quad Li$$

is contacted under anhydrous conditions with $$CH_2=CHSi(CH_3)[N(CH_3)_2]_2$$

a high molecular weight polymer is obtained.

EXAMPLE 31

When the following metal halides are reacted with
(CH₃)₂NSi(CH₃)₂CH₂MgCl
the indicated products are obtained.

| Metal halide | Product |
|---|---|
| AlCl(CH₂CH₂CH₂CH₃)₂ | (CH₃)₂NSi(CH₃)₂CH₂Al(CH₂CH₂CH₂CH₃)₂ |
| CdCl₂ | (CH₃)₂NSi(CH₃)₂CH₂CdCl |
| ZnBr₂ | (CH₃)₂NSi(CH₃)₂CH₂ZnBr |
| HgCl₂ | (CH₃)₂NSi(CH₃)₂CH₂HgCl |
| ZnCl[(CH₂)₅CH₃] | (CH₃)₂NSi(CH₃)₂CH₂Zn(CH₂)₅CH₃ |

EXAMPLE 32

When hexylsodium and

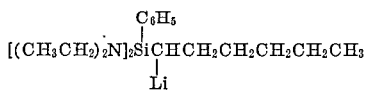

are contacted under anhydrous conditions,

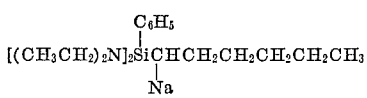

is obtained.

That which is claimed is:

1. An organometallic aminosilicon compound having at least one silicon group of the general formula

wherein any remaining valence of the silicon atom is bonded to a carbon atom which is an atom in a radical selected from the group consisting of an organic radical composed of atoms selected from the group consisting of carbon, hydrogen, nitrogen and oxygen in the form of ether linkages and an organosilicon radical composed of atoms selected from the group consisting of silicon, carbon, hydrogen, nitrogen, and oxygen in the form of ether linkages, in which there is present a M-carbon bond, where R is a monovalent radical bonded to the silicon atom through a silicon-carbon bond and composed of carbon, hydrogen, nitrogen, silicon or oxygen atoms in the form of ether linkages, R' is a monovalent radical bonded to the nitrogen atom through a silicon-nitrogen bond or a carbon-nitrogen bond and composed of carbon, hydrogen, nitrogen, silicon or oxygen atoms in the form of ether linkages, M is a metal selected from the group consisting of Li, Na, K, Al, Mg, Hg, Pt, Cd, Zn, MgR, MgX, HgR, Pb, HgX, PbX, PbX₃, PbR, PbX₂R, PbXR₂, AlXR, AlX₂, AlR₂, CdX, CdR, PtX(PR₃)₂, PtXR₂, ZnR and ZnX, X is a halogen atom, m is an integer from 1 to 3 inclusive, a is an integer from 0 to 2 inclusive, the sum of a+m does not exceed 3, any silicon atom in the organometallic aminosilicon compound is bonded only to an atom selected from the group consisting of carbon and nitrogen, any nitrogen atom in the organometallic aminosilicon compound is bonded only to an atom selected from the group consisting of silicon and carbon, any R and R' can be bonded together to form a cyclic structure, and the organic groups are free of —C≡CH groups.

2. The organometallic aminosilicon compound according to claim 1 wherein R is a monovalent radical selected from the group consisting of alkyl radicals, aryl radicals, alkaryl radicals, and aralkyl radicals, R' is a monovalent radical selected from the group consisting of alkyl radicals, aryl radicals, alkaryl radicals and aralkyl radicals.

3. The organometallic aminosilicon compound according to claim 1 where M is Li.

4. The organometallic aminosilicon compound according to claim 1 where M is MgX.

5. The organometallic aminosilicon compound according to claim 1 where R is methyl, R' is methyl, a is 2, m is 1 and the remaining valence of the silicon atom is satisfied by a radical of the formula —CH₂MgCl.

6. The organometallic aminosilicon compound according to claim 1 where R is methyl, R' is methyl, a is 2, m is 1 and the remaining valence of the silicon atom is satisfied by a radical of the formula —CH₂CH(CH₃)CH₂MgCl 7. The organometallic aminosilicon compound according to claim 1 where R is methyl, R' is methyl, a is 1, m is 2 and the remaining valence of the silicon atom is satisfied by a radical of the formula

8. The organometallic aminosilicon compound according to claim 1 where R is methyl, R' is methyl, a is 2, m is 1 and the remaining valence of the silicon atom is satisfied by a radical of the formula —CH₂PtCl[P(CH₂CH₂CH₂CH₃)₃]₂

9. An organolithium aminosilicon compound of the general formula

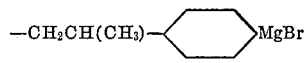

wherein each R and R' is a monovalent radical selected from the group consisting of alkyl radicals, aryl radicals, aralkyl radicals and alkaryl radicals, m is an integer from 1 to 3 inclusive, x is an integer of at least 1.

10. The organolithium aminosilicon compound of claim 9 where m is 1.

11. The organolithium aminosilicon compound of claim 9 where m is 2.

12. The organolithium aminosilicon compound of claim 9 where m is 3.

13. An organolithium aminosilicon compound of the general formula

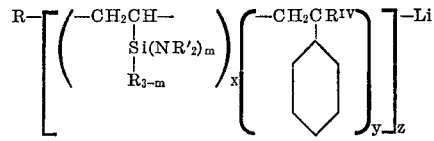

wherein each R and R' is a monovalent radical selected from the group consisting of alkyl radicals, aryl radicals, alkaryl radicals and aralkyl radicals, m is an integer from 1 to 3 inclusive, x is at least 1, y is at least 1 and z is at least 1, and $R^{IV}$ is a monovalent radical selected from the group consisting of hydrogen and methyl.

14. The organolithium aminosilicon compound according to claim 13 where $R^{IV}$ is hydrogen.

15. The organolithium aminosilicon compound according to claim 13 where $R^{IV}$ is methyl.

16. An organolithium aminosilicon compound of the general formula

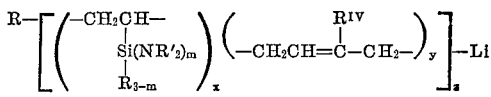

wherein each R and R' is a monovalent radical selected from the group consisting of alkyl radicals, aryl radicals, alkaryl radicals, and aralkyl radicals, $R^{IV}$ is a monovalent radical selected from the group consisting of methyl and hydrogen, m is an integer from 1 to 3 inclusive, x is an integer of at least 1, y is an integer of at least 1 and z is an integer of at least 1.

17. The organolithium aminosilicon compound of claim 16 where $R^{IV}$ is methyl.

18. An organolithium aminosilicon compound of the general formula

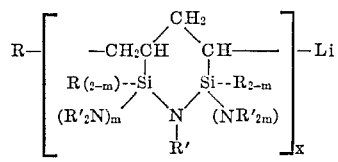

wherein each R and R′ is a monovalent radical selected from the group consisting of alkyl radicals, aryl radicals, alkaryl radicals and aralkyl radicals, $m$ is an integer from 0 to 2 inclusive and $x$ is an integer of at least 1.

19. An organomagnesium aminosilicon compound of the general formula

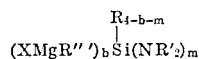

wherein each R and R′ is a monovalent radical selected from the group consisting of alkyl radicals, aryl radicals, alkaryl radicals and aralkyl radicals, $m$ is an integer from 1 to 3 inclusive, $b$ is an integer from 1 to 3 inclusive, X is a halogen atom and R‴ is a divalent organic radical composed of carbon and hydrogen atoms or carbon, hydrogen and oxygen atoms in the form of ether linkages.

20. A method comprising (I) contacting under essentially anhydrous conditions a (diorganoamino)silicon compound of the general formula

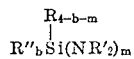

wherein R is a monovalent radical bonded to the silicon atom through a silicon-carbon bond and composed of atoms selected from the group consisting of carbon, hydrogen, nitrogen, silicon and oxygen in the form of ether linkages, R′ is a monovalent radical bonded to the nitrogen atom through a silicon-nitrogen bond or a carbon-nitrogen bond and composed of atoms selected from the group consisting of carbon, hydrogen, nitrogen, silicon and oxygen in the form of ether linkage, R″ is a monovalent hydrocarbon radical selected from the group consisting of vinyl radicals, conjugated unsaturated aromatic-aliphatic radicals, $b$ is an integer from 1 to 3 inclusive, $m$ is an integer from 1 to 3 inclusive and the sum of $b+m$ has a maximum of 4, and an organolithium compound of the formula Li—R wherein R is defined above and thereafter (II) recovering an organolithium (diorganomino)silicon compound.

21. The method according to claim 20 wherein the (diorganoamino)silicon compound and the organolithium compound are contacted in the presence of an inert organic solvent.

22. The method according to claim 21 wherein the inert organic solvent is selected from the group consisting of diethyl ether, tetrahydrofuran, toluene, benzene, hexane and pentane.

23. The method according to claim 20 wherein the organolithium compound is n-butyllithium.

24. The method according to claim 22 wherein the organolithium compound is n-butyllithium.

25. The method according to claim 20 wherein R″ is vinyl.

26. The method according to claim 23 wherein R″ is vinyl.

27. The method according to claim 24 wherein R″ is vinyl.

References Cited

UNITED STATES PATENTS 3,393,218   7/1968   Van Wazer et al. ___ 260—448.2

U.S. Cl. X.R.

260—429.9, 431, 433, 435, 437, 448, 448.2